United States Patent
Zhang et al.

(10) Patent No.: US 10,271,052 B2
(45) Date of Patent: Apr. 23, 2019

(54) UNIVERSAL COLOR-SPACE INVERSE TRANSFORM CODING

(71) Applicant: QUALCOMM Incorporated, San Diego, CA (US)

(72) Inventors: Li Zhang, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/656,532

(22) Filed: Mar. 12, 2015

(65) Prior Publication Data
US 2015/0264364 A1    Sep. 17, 2015

Related U.S. Application Data

(60) Provisional application No. 61/953,573, filed on Mar. 14, 2014, provisional application No. 61/981,645, (Continued)

(51) Int. Cl.
*H04N 19/11*    (2014.01)
*H04N 19/12*    (2014.01)
(Continued)

(52) U.S. Cl.
CPC ......... *H04N 19/126* (2014.11); *H04N 19/102* (2014.11); *H04N 19/103* (2014.11); (Continued)

(58) Field of Classification Search
USPC .................................................. 375/240.18
See application file for complete search history.

(56) References Cited

U.S. PATENT DOCUMENTS 8,446,960 B2 *  5/2013  Marpe ............... H04N 9/67
                                                375/240.18
8,942,282 B2   1/2015  Karczewicz et al.
(Continued)

FOREIGN PATENT DOCUMENTS

CN    101075348 A    11/2007
CN    103297769 A    9/2013
(Continued)

OTHER PUBLICATIONS

Wiegand et al. (Wiegand et al. "Overview of the H.264/AVC video coding standard," in IEEE Transactions on Circuits and Systems for Video Technology, vol. 13, No. 7, pp. 560-576, Jul. 2003. doi: 10.1109/TCSVT.2003.815165).*

(Continued)

*Primary Examiner* — Behrooz M Senfi
*Assistant Examiner* — Ana Picon-Feliciano
(74) *Attorney, Agent, or Firm* — Shumaker & Sieffert, P.A.

(57) ABSTRACT

In general, this disclosure describes techniques for coding video blocks using a color-space conversion process. A video coder, such as a video encoder or a video decoder, may determine a coding mode used to encode the video data. The coding mode may be one of a lossy coding mode or a lossless coding mode. The video coder may determine a color-space transform process dependent on the coding mode used to encode the video data. The video coder may apply the color-space transform process in encoding the video data. In decoding the video data, independent of whether the coding mode is the lossy coding mode or the lossless coding mode, the video coder may apply the same color-space inverse transform process in a decoding loop of the encoding process.

68 Claims, 9 Drawing Sheets

Related U.S. Application Data filed on Apr. 18, 2014, provisional application No. 62/062,637, filed on Oct. 10, 2014.

(51) Int. Cl.

| | | |
|---|---|---|
| *H04N 19/14* | (2014.01) | |
| *H04N 19/18* | (2014.01) | |
| *H04N 19/33* | (2014.01) | |
| *H04N 19/44* | (2014.01) | |
| *H04N 19/60* | (2014.01) | |
| *H04N 19/61* | (2014.01) | |
| *H04N 19/70* | (2014.01) | |
| *H04N 19/102* | (2014.01) | |
| *H04N 19/103* | (2014.01) | |
| *H04N 19/126* | (2014.01) | |
| *H04N 19/134* | (2014.01) | |
| *H04N 19/136* | (2014.01) | |
| *H04N 19/154* | (2014.01) | |
| *H04N 19/157* | (2014.01) | |
| *H04N 19/176* | (2014.01) | |
| *H04N 19/184* | (2014.01) | |
| *H04N 19/186* | (2014.01) | |
| *H04N 19/196* | (2014.01) | |

(52) U.S. Cl.
CPC .............. *H04N 19/11* (2014.11); *H04N 19/12* (2014.11); *H04N 19/134* (2014.11); *H04N 19/136* (2014.11); *H04N 19/14* (2014.11); *H04N 19/154* (2014.11); *H04N 19/157* (2014.11); *H04N 19/176* (2014.11); *H04N 19/18* (2014.11); *H04N 19/184* (2014.11); *H04N 19/186* (2014.11); *H04N 19/196* (2014.11); *H04N 19/33* (2014.11); *H04N 19/44* (2014.11); *H04N 19/60* (2014.11); *H04N 19/61* (2014.11); *H04N 19/70* (2014.11)

(56) References Cited

U.S. PATENT DOCUMENTS

| | | | |
|---|---|---|---|
| 2005/0147295 A1 | 7/2005 | Kim et al. | |
| 2005/0259730 A1* | 11/2005 | Sun | H04N 11/042 375/240.03 |
| 2006/0018559 A1 | 1/2006 | Kim et al. | |
| 2007/0171490 A1 | 7/2007 | Cho et al. | |
| 2007/0211797 A1 | 9/2007 | Kim et al. | |
| 2009/0123066 A1* | 5/2009 | Moriya | H04N 19/139 382/166 |
| 2009/0245664 A1 | 10/2009 | Matsumoto et al. | |
| 2010/0046628 A1* | 2/2010 | Bhaskaran | H04N 19/103 375/240.24 |
| 2011/0255798 A1 | 10/2011 | Fujino et al. | |
| 2011/0309958 A1 | 12/2011 | Yoo et al. | |
| 2013/0010864 A1* | 1/2013 | Teng | H04N 19/176 375/240.12 |
| 2013/0315493 A1 | 11/2013 | Sato | |
| 2013/0329783 A1 | 12/2013 | Sato | |
| 2014/0003497 A1 | 1/2014 | Sullivan et al. | |
| 2014/0003515 A1 | 1/2014 | Ohgose et al. | |
| 2014/0098857 A1* | 4/2014 | MacInnis | H04N 19/46 375/240.03 |
| 2014/0233658 A1 | 8/2014 | Guerrero | |
| 2014/0341305 A1 | 11/2014 | Qu et al. | |
| 2014/0376611 A1 | 12/2014 | Kim et al. | |
| 2015/0110181 A1 | 4/2015 | Saxena et al. | |
| 2015/0117519 A1 | 4/2015 | Kim et al. | |
| 2015/0195526 A1* | 7/2015 | Zhu | H04N 19/105 375/240.14 |
| 2015/0264354 A1 | 9/2015 | Zhang et al. | |
| 2015/0264402 A1 | 9/2015 | Zhang et al. | |
| 2015/0264405 A1 | 9/2015 | Zhang et al. | |
| 2016/0080751 A1 | 3/2016 | Xiu et al. | |
| 2016/0227210 A1 | 8/2016 | Nguyen et al. | |

FOREIGN PATENT DOCUMENTS

| | | |
|---|---|---|
| CN | 103458242 A | 12/2013 |
| JP | 2009529845 A | 8/2009 |
| JP | 2009239565 A | 10/2009 |
| JP | 2013176168 A | 9/2013 |
| WO | 2007034601 A1 | 3/2007 |
| WO | 2011130334 A2 | 10/2011 |
| WO | 2015065979 | 5/2015 |

OTHER PUBLICATIONS

Sun (Sun, "Residual Color Transform Using YCoCg-R," JVT Meeting; MPEG Meeting; Jul. 19-23, 2004; Redmond,WA, US; (Joint Video Team of ISO/IEC JTC1/SC29/WG11 and ITU-T SG.16 Q.6), No. JVT-L014r1, XP030005869, 7 pp.).*

Kim et al.(Kim et al., "Adaptive Residue Transform and Sampling," Document JVT-K018, Joint Video Team (JVT) of ISO/IEC MPEG & ITU-T VCEG(ISO/IEC JTC1/SC29/WG11 and ITU-T SG16 Q6), Mar. 15-19, 2004, XP002390617, 16 pp.).*

Wiegand et al., "WD1: Working Draft 1 of High-Efficiency Video Coding," JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, CH, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union, Apr. 2015, 634 pp.

(56) References Cited

OTHER PUBLICATIONS

"Advanced video coding for generic audiovisual services; H.264 (Mar. 2005)," ITU-T Standard, International Telecommunication Union, Geneva, CH, No. H.264 (Mar. 2005), Mar. 2005, XP017434835, 341 pp.

Dai et al., "RCE1: Adaptive Color Transforms for Range Extensions," Document JCTVC-M0048-r1, Apr. 18-28, 2013, XP055196604, 11 pp.

Flynn et al., "High Efficiency Video Coding (HEVC) Range Extensions text specification: Draft 4," JCT-VC Meeting; Apr. 18-26, 2013, Incheon, KR; (Joint Collaborative Team on Video Coding (JCT-VC) of ITU-T SG 16 WP 3 and ISO/IEC JTC 1/SC29/WG11); URL: http://wftp3.itu.int/av-arch/jctvc-site/, No. JCTVC-N1005-v3, Apr. 18-26 2013; XP030114950, 321 pp.

Kim et al., "RGB Video Coding Using Residual Color Transform," Samsung Journal of Innovative Technology, vol. 1, No. 1, Aug. 2005, XP55005343, pp. 21-31.

Kim et al., "Adaptive Residue Transform and Sampling," Document JVT-K018, Joint Video Team (JVT) of ISO/IEC MPEG & ITU-T VCEG(ISO/IEC JTC1/SC29/WG11 and ITU-T SG16 Q6), Mar. 15-19, 2004, XP002390617, 16 pp.

Xiu et al., "Adaptive color transform for different luma and chroma bit-depth," Document JCTVC-S018_r3, Strasbourg, FR, Oct. 17-24, 2014, XP055196650, 9 pp.

Li et al., "On residual adaptive colour transform," JCT-VC Meeting; Oct. 17-24, 2014; Strasbourg, FR; (Joint Collaborative Team on Video Coding (JCT-VC) of ITU-T SG.16 WP 3 and ISO/IEC JTC1/SC29/WG11); URL: http://wftp3.itu.int/av-arch/jctvc-site/, No. JCTVC-50086, XP030116829, 15 pp.

Malvar et al., "Lifting-based reversible color transformations for image compression," Proceedings of SPIE, vol. 7073, Aug. 28, 2008, XP55201760, 10 pp.

Marpe et al., "MB-adaptive 4:4:4 residual color transform for 4:4:4 coding," JVT Meeting; 75. MPEG Meeting; Jan. 14-20, 2006; Bangkok,TH; (Joint Video Team of ISO/IEC JTC1/SC29/WG11 and ITU-T SG.16 Q.6) No. JVT-R071di, XP030006338, 14 pp.

Rabbani et al., "An overview of the JPEG 2000 still image compression standard," Signal Processing: Image Communication 17 (2002), Equation 16, pp. 3-48.

Sun, "Residual Color Transform Using YCoCg-R," JVT Meeting; MPEG Meeting; Jul. 19-23, 2004; Redmond, WA, US; (Joint Video Team of ISO/IEC JTC1/SC29/WG11 and ITU-T SG.16 Q.6), No. JVT-L014r1, XP030005869, 7 pp.

Wiegand et al., "Overview of the H.264/AVC Video Coding Standard," IEEE Transactions on Circuits and Systems for Video Technology, IEEE Service Center, Piscataway, NJ, US, vol. 13, No. 7, Jul. 2003, XP011221093, pp. 560-576.

Zhang et al., "SCCE5 Test 3.2.1: In-loop color-space transform," JCT-VC Meeting; Jun. 30-Jul. 9, 2014; Sapporo, JP; (Joint Collaborative Team on Video Coding of ITU-T SG 16 WP 3 and ISO/IEC JTC1/SC29/WG11); No. JCTVC-R0147, XP030116426, 8 pp.

Itu-T H.223, Series H: Audiovisual and Multimedia Systems, Infrastructure of audiovisual services—Transmission multiplexing and synchronization, Multiplexing protocol for low bit rate multimedia communication, The International Telecommunication Union. Jul. 2001, 74 pp.

Paila et al., "FLUTE—File Delivery over Unidirectional Transport," Internet Engineering Task Force, RFC 6726, Nov. 2012, 46 pp.

Wang et al., "High Efficiency Video Coding (HEVC) Defect Report 3," (Joint Collaborative Team on Video Coding of ITU-T SG.16 WP 3 and ISO/IEC JTC 1/SC29/WG11); Document: JCTVC-P1003_v1, Jan. 9-17, 2014, 313 pp.

Flynn et al., "High Efficiency Video Coding (HEVC) Range Extensions text specification: Draft 6," (Joint Collaborative Team on Video Coding of ITU-T SG.16 WP 3 and ISO/IEC JTC1/SC29/WG11); Document: JCTVC-P1005_v1, Jan. 9-17, 2014, 368 pp.

Kawamura et al., "AHG7: In-loop color-space transformation of residual signals for range extensions," (Joint Collaborative Team on Video Coding of ITU-T SG.16 WP 3 and ISO/IEC JTC1/SC29/WG11); Document: JCTVC-L0371, Jan. 14-23, 2013, 4 pp.

International Search Report and Written Opinion from International Application No. PCT/US2015/020529, dated July 20, 2015, 15 pp.

U.S. Appl. No. 14/656,516, filed by Zhang, Li, et al., on Mar. 12, 2015.

U.S. Appl. No. 61/953,573, filed by Zhang, Li, et al., on Mar. 14, 2014.

U.S. Appl. No. 14/656,526, filed by Zhang, Li, et al., on Mar. 12, 2015.

U.S. Appl. No. 14/656,482, filed by Zhang, Li, et al., on Mar. 12, 2015.

U.S. Appl. No. 61/810,649, filed by Guo, Liwei, et al., on Apr. 10, 2013.

International Preliminary Report on Patentability of International Application No. PCT/US2015/020529 dated Sep. 22, 2016, 11 pp.

Kawamura K., et al., "AHG7: Adaptive colour-space transformation of residual signals," KDDI Corp., JCTVC-K0193_r1, 11th Meeting, Oct. 10-19, 2012, pp. 1-5.

Chen J., et al., "Description of screen content coding technology proposal by Qualcomn", 17. JCT-VC Meeting; Valencia, (Joint Collaborative Team on Video Coding of ISO/IEC JTC1/SC29/WG11 and ITU-T SG.16), No. JCTVC-Q0031, Mar. 18, 2014 (Mar. 18, 2014), XP030115915, pp. 1-18.

Joshi R., et al., "Screen content coding test model 3 (SCM 3)", Joint Collaborative Team on Video Coding (JCT-VC) of ITU-T SG 16 WP 3 and ISO/IEC JTC 1/SC 29/WG 11 19th Meeting: Strasbourg, FR, Oct. 17-24, 2014, JCTVC-S1014-v1.zip, Feb. 5, 2015, 13 pages.

Joshi R., et al., "High Efficiency Video Coding (HEVC) Screen Content Coding: Draft 2," 18th JCT-VC Meeting, Sapporo, JP, Joint Collaborative Team on Video Coding (JCT-VC) of ITU-T SG 16 WP 3 and ISO/IEC JTC 1/SC 29/WG 11, JCTVC-51005, Jun. 30-Jul. 9, 2014, 374 pp.

\* cited by examiner

UNIVERSAL COLOR-SPACE INVERSE TRANSFORM CODING

This application claims the benefit of U.S. Provisional Application No. 61/953,573, filed Mar. 14, 2014, U.S. Provisional Application No. 61/981,645, filed Apr. 18, 2014, and U.S. Provisional Application No. 62/062,637, filed Oct. 10, 2014, the entire content each of which is incorporated herein by reference.

TECHNICAL FIELD

This disclosure relates to video coding and, more specifically, video coding using color-space conversion.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding video blocks using a color-space conversion process. A video coder, such as a video encoder or a video decoder, may determine a coding mode used to encode the video data. The coding mode may be one of a lossy coding mode or a lossless coding mode. The video coder may determine a color-space transform process dependent on the coding mode used to encode the video data. The video coder may apply the color-space transform process in encoding the video data. In decoding the video data, independent of whether the coding mode is the lossy coding mode or the lossless coding mode, the video coder may apply the same color-space inverse transform process in a decoding loop of the encoding process.

In one example, a method for decoding video data is described. The method comprises receiving a first encoded block of video data, wherein the first encoded block of video data was encoded using a lossy coding mode and a first color-space transform process. The method also includes receiving a second encoded block of video data, wherein the second encoded block of video data was encoded using a lossless coding mode and a second color-space transform process. The method further includes applying a color-space inverse transform process to the first encoded and applying the same color-space inverse transform process to the second encoded block of video data.

In another example, a device includes a memory configured to store video data and one or more processors configured to receive a first encoded block of video data, wherein the first encoded block of video data was encoded using a lossy coding mode and a first color-space transform process. In addition, the one or more processors is also configured to receive a second encoded block of video data, wherein the second encoded block of video data was encoded using a lossless coding mode and a second color-space transform process. The one or more processors is further configured to apply a color-space inverse transform process to the first encoded and apply the same color-space inverse transform process to the second encoded block of video data.

In another example, a device includes means for receiving a first encoded block of video data, wherein the first encoded block of video data was encoded using a lossy coding mode and a first color-space transform process, and means for receiving a second encoded block of video data, wherein the second encoded block of video data was encoded using a lossless coding mode and a second color-space transform process. The device further includes means for applying a color-space inverse transform process to the first encoded block of video data and means for applying the color-space inverse transform process to the second encoded block of video data.

In another example, a computer-readable storage medium comprising instructions that, when executed, cause one or more processors to receive a first encoded block of video data, wherein the first encoded block of video data was encoded using a lossy coding mode and a first color-space transform process, and receive a second encoded block of video data, wherein the second encoded block of video data was encoded using a lossless coding mode and a second color-space transform process. The instructions, when executed, also cause the processor to apply a color-space inverse transform process to the first encoded block of video data and apply the color-space inverse transform process to the second encoded block of video data.

In another example, a method for encoding video data is described. The method comprises determining a coding mode used to encode the video data, wherein the coding mode is one of a lossy coding mode or a lossless coding mode, and determining a color-space transform process dependent on the coding mode used to encode the video data. The method further includes applying the color-space transform process to the video data. The method also includes applying a color-space inverse transform process in a decoding loop of the encoding process, wherein the color-space inverse transform process is independent of whether the coding mode is the lossy coding mode or the lossless coding mode.

In another example, a device includes a memory configured to store video data and one or more processors configured to determine a coding mode used to encode the video data, wherein the coding mode is one of a lossy coding mode or a lossless coding mode, and determine a color-space transform process dependent on the coding mode used to encode the video data. The one or more processors are further configured to apply the color-space transform process to the video data. The one or more processors are also configured to apply a color-space inverse transform process in a decoding loop of the encoding process, wherein the color-space inverse transform process is independent of whether the coding mode is the lossy coding mode or the lossless coding mode.

In another example, a device includes means for determining a coding mode used to encode the video data, wherein the coding mode is one of a lossy coding mode or a lossless coding mode, and means for determining a color-space transform process dependent on the coding mode used to encode the video data. The device further includes means for applying the color-space transform process to the video data. The device also includes means for applying a color-space inverse transform process in a decoding loop of the encoding process, wherein the color-space inverse transform process is independent of whether the coding mode is the lossy coding mode or the lossless coding mode.

In another example, a computer-readable storage medium comprises instructions that, when executed, cause one or more processors to determine a coding mode used to encode the video data, wherein the coding mode is one of a lossy coding mode or a lossless coding mode, and determine a color-space transform process dependent on the coding mode used to encode the video data. The instructions further cause the one or more processors to apply the color-space transform process to the video data. The instructions also cause the one or more processors to apply a color-space inverse transform process in a decoding loop of the encoding process, wherein the color-space inverse transform process is independent of whether the coding mode is the lossy coding mode or the lossless coding mode.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
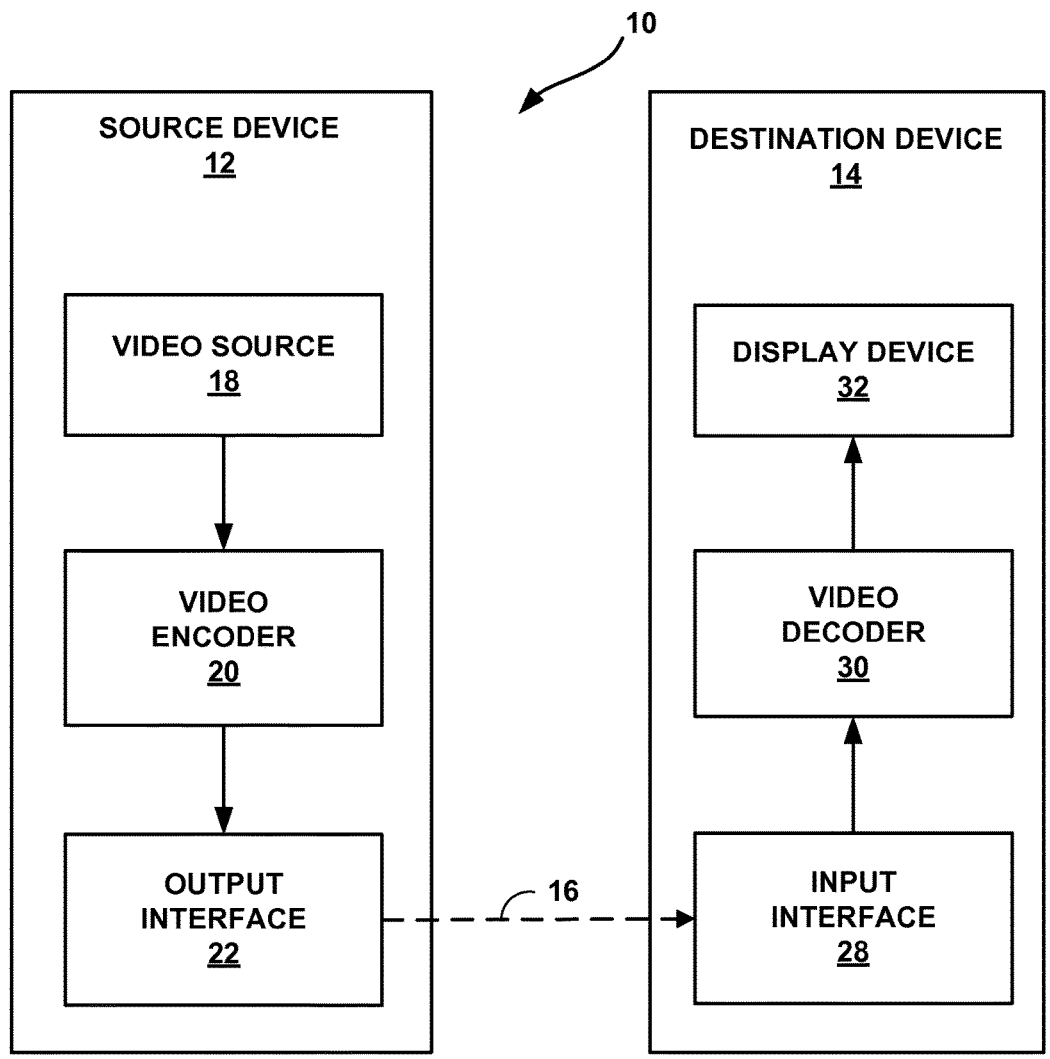
FIG. 1 is a block diagram illustrating an example video encoding and decoding system that may utilize the techniques described in this disclosure.

In some examples, this disclosure is related to screen content coding, wherein high chroma sampling format 4:4:4 is used. In some examples, this disclosure is also applicable for range extensions (RCEx), including the support of possibly high bit depth, (more than 8 bit), high chroma sampling format 4:4:4. In some examples, this disclosure is also applicable to other color formats, such as chroma sampling format is 4:2:2. More specifically, in this disclosure, many different techniques related to color-space conversion are described.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

The design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG).

In HEVC, the largest coding unit in a slice is called a coding tree block (CTB). A CTB contains a quad-tree the nodes of which are coding units. The size of a CTB can range from 16×16 to 64×64 in the HEVC main profile, although 8×8 CTB sizes can be supported. A coding unit (CU) could be the same size as a CTB and as small as 8×8. Each CU is coded with one mode. When a CU is inter coded, the CU may be further partitioned into two prediction units (PUs) or become a single PU when further partitions do not apply. When two PUs are present in one CU, each PU can be half size rectangles or two rectangles with a size equal to ¼ or ¾ the size of the CU.

When the CU is inter coded, one set of motion information is present for each PU. In addition, each PU is coded with a unique inter-prediction mode to derive the set of motion information. In HEVC, the smallest PU sizes are 8×4 and 4×8.

HEVC specifies four transform units (TUs) with sizes of 4×4, 8×8, 16×16, and 32×32 to code the prediction residual. A CTB may be recursively partitioned into 4 or more TUs. TUs use integer-based functions that are similar to discrete cosine transform (DCT) functions. In addition, 4×4 luma transform blocks that belong to an intra coded region are transformed using an integer transform that is derived from a discrete sine transform (DST) function. Chroma uses the same TU sizes as luma.

In the current HEVC standard, for the luma component of each Prediction Unit (PU), an intra prediction method is utilized with 33 angular prediction modes (indexed from 2 to 34), a DC mode (indexed with 1), and a Planar mode (indexed with 0), as described below with respect to FIG. 4.

In addition to the above 35 intra modes, one more mode, named 'I-PCM', is also employed by HEVC. In I-PCM mode, prediction, transform, quantization, and entropy coding are bypassed while the prediction samples are coded by a predefined number of bits. The main purpose of the I-PCM mode is to handle the situation when the signal cannot be efficiently coded by other modes.

In the current HEVC standard, there are two inter prediction modes available. One such mode is merge mode (skip is considered as a special case of merge), and the second such mode is advanced motion vector prediction (AMVP) mode for a prediction unit (PU).

In both AMVP and merge mode, a motion vector (MV) candidate list is maintained for multiple motion vector predictors. The motion vector(s), as well as reference indices in the merge mode, of the current PU are generated by taking one candidate from the MV candidate list.

The MV candidate list may contain up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

A merge candidate corresponds to a full set of motion information while an AMVP candidate may contain just one motion vector for a specific prediction direction and reference index. The candidates for both modes are derived similarly from the same spatial and temporal neighboring blocks.

As described below with respect to FIG. 5, spatial MV candidates are derived from the neighboring blocks shown on FIG. 5, for a specific PU (PU0). However, the methods generating the candidates from the blocks differ for merge and AMVP modes.

Figure 5:
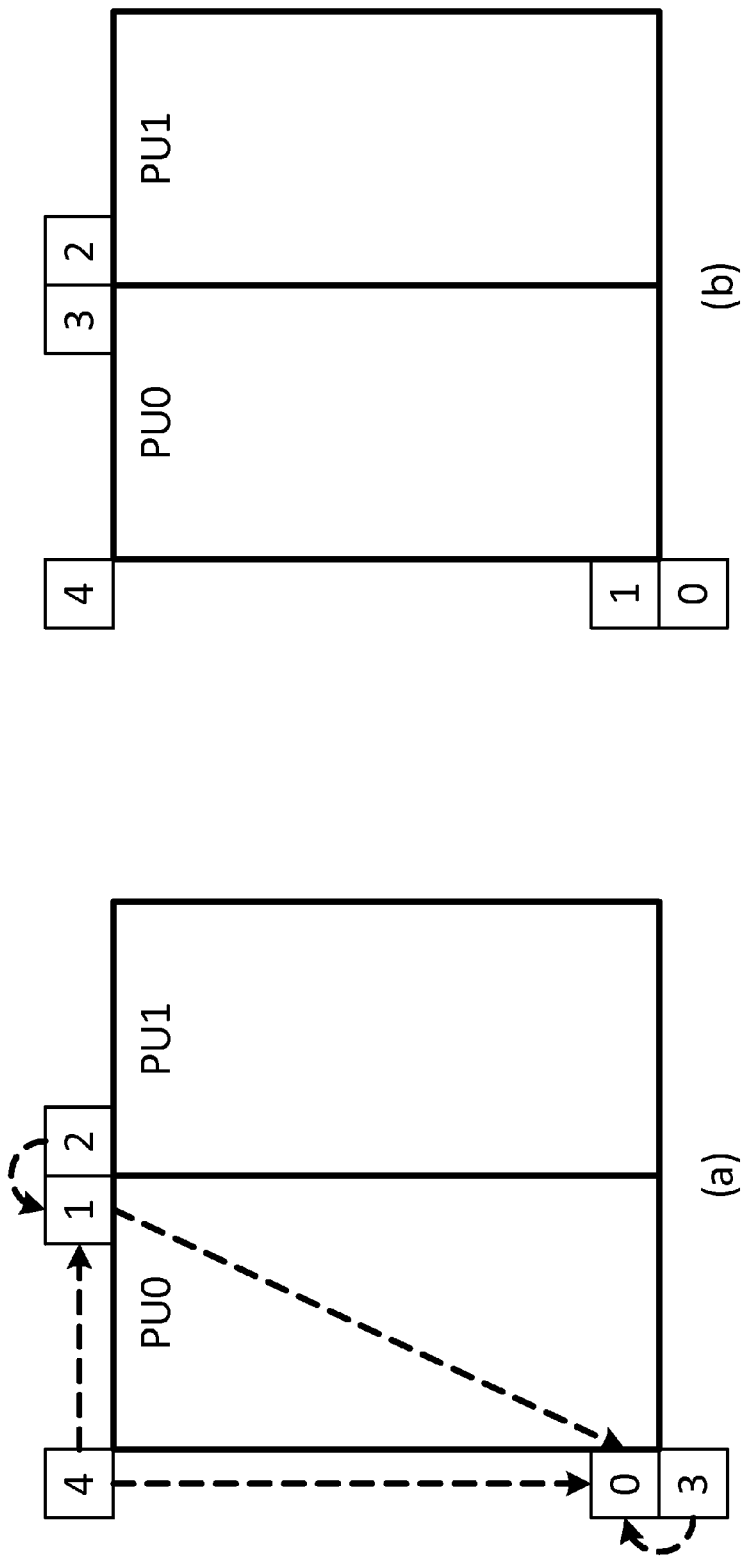
FIG. 5 is a conceptual diagram illustrating spatial neighboring motion vector candidates for merge and advanced motion vector prediction (AMVP) modes according to one or more techniques of the current disclosure.

In merge mode, up to four spatial MV candidates can be derived with the orders showed on FIG. 5(*a*) with numbers. The order is as follows: left (0), above (1), above right (2), below left (3), and above left (4), as shown in FIG. 5(*a*).

In AMVP mode, the neighboring blocks are divided into two groups: a left group including block 0 and 1, and an above group including the blocks 2, 3, and 4 as shown on FIG. 5(*b*). For each group, the potential candidate in a neighboring block referring to the same reference picture as that indicated by the signaled reference index has the highest priority to be chosen to form a final candidate of the group.

It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 6:
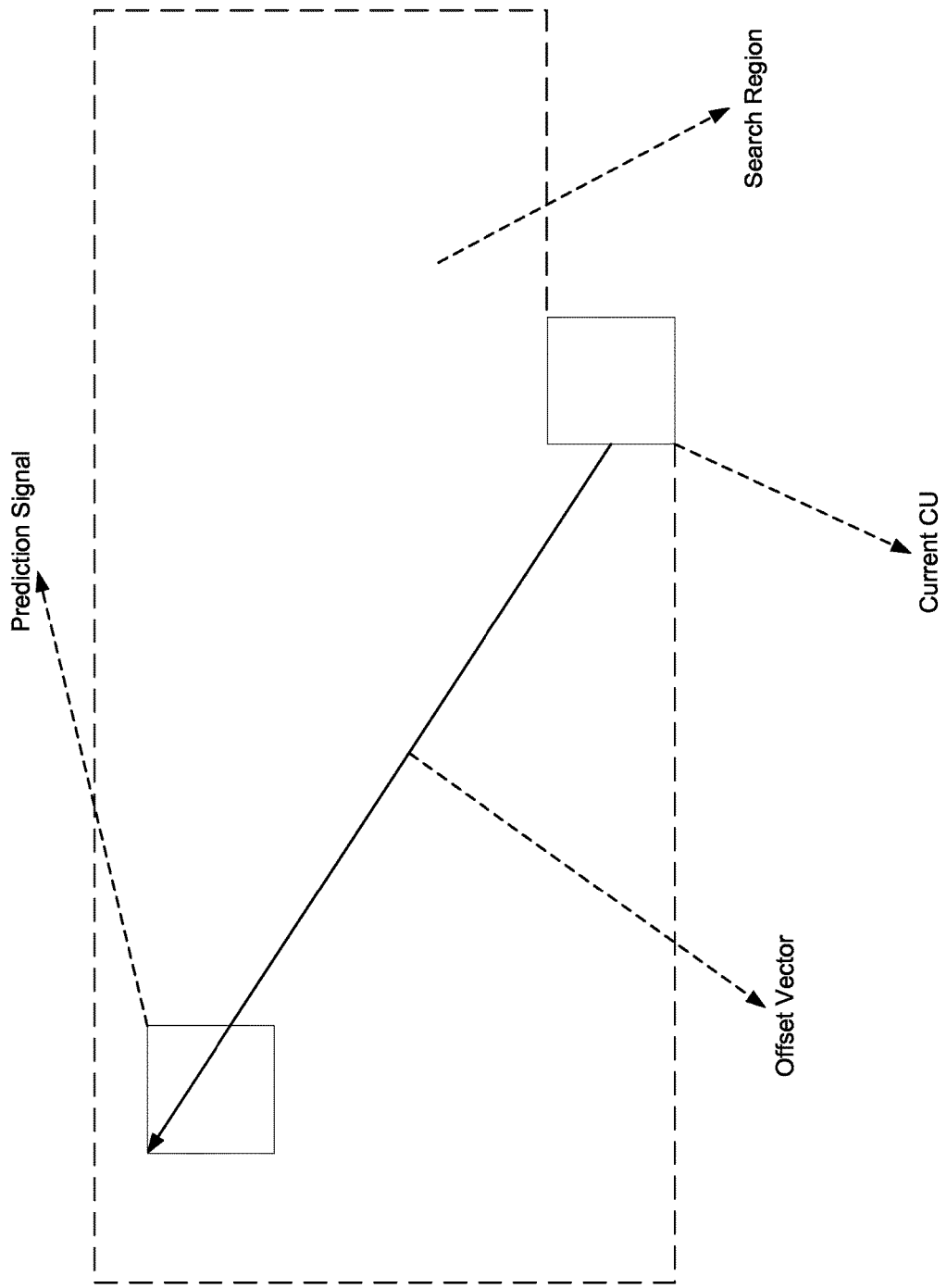
FIG. 6 is a conceptual diagram illustrating an intra block copy (BC) example according to one or more techniques of the current disclosure.

As described below with respect to FIG. 6, the Intra Block-Copy (BC) has been included in SCC. An example of Intra BC is shown in FIG. 6, wherein the current CU is predicted from an already decoded block of the current picture/slice. The current Intra BC block size can be as large as a CU size, which ranges from 8×8 to 64×64, although in some applications, further constrains may apply.

In some examples, an in-loop color-space transform process for residual signals can be used for sequences in 4:4:4 chroma format. This method transforms prediction error signals in RGB/YUV chroma format into those in a suboptimal color-space. With this additional step, the correlation among the color components could be further reduced. The transform matrix is derived from pixel sample values for each coding unit by a singular-value-decomposition (SVD). The color-space transform is applied to prediction error of both intra and inter mode.

In some examples, when the color-space transform process is applied to inter mode, the residual is firstly converted to a different domain with the derived transform matrix. After the color-space conversion, the conventional coding steps, such as DCT/DST, quantization, and entropy coding are performed in order.

In some examples, when the color-space transform process is applied to intra mode, the prediction and current block are firstly converted to a different domain with the derived transform matrix, respectively. After the color-space conversion, the residual between current block and its predictor is further transformed with DCT/DST, quantized, and entropy coded.

In the forward operation, a color-space transform matrix is applied to the three planes G, B, and R as follows:

$$\begin{bmatrix} a & b & c \\ d & e & f \\ g & h & i \end{bmatrix} \begin{bmatrix} G \\ B \\ R \end{bmatrix} = \begin{bmatrix} P \\ Q \\ S \end{bmatrix}.$$

Resulting values are clipped within the range of the HEVC specification because, in some examples, values are enlarged up to $\sqrt{3}$ times. In the inverse operation, a color-space transform matrix is applied to the three components P', Q', and R' as follows, $$\begin{bmatrix} a & b & c \\ d & e & f \\ g & h & i \end{bmatrix}^t \begin{bmatrix} P' \\ Q' \\ S' \end{bmatrix} = \begin{bmatrix} G' \\ B' \\ R' \end{bmatrix}.$$

Figure 7:
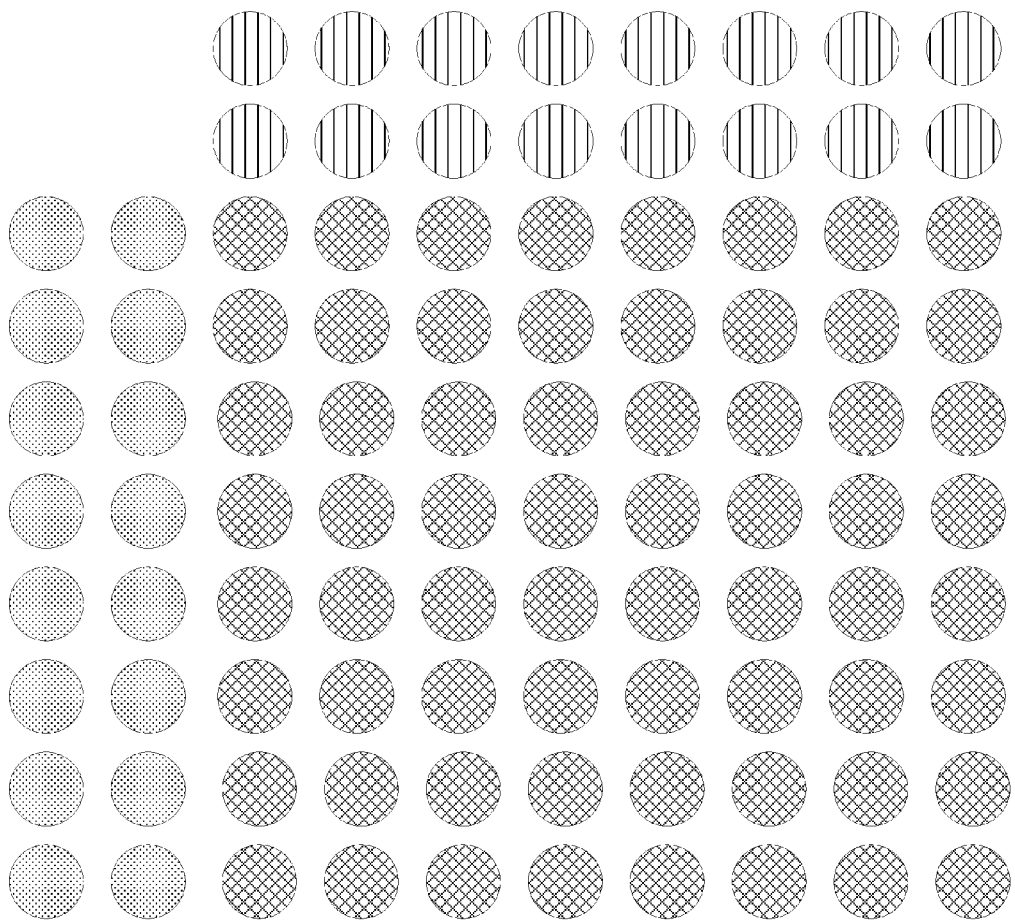
FIG. 7 is a conceptual diagram illustrating an example of a target block and reference sample for an intra 8×8 block, according to one or more techniques of the current disclosure.

As described below with respect to FIG. 7, a transform matrix may be derived from the reference sample values. Different reference samples can be utilized for the intra case and inter case. For the case of an intra coded block, a target block and reference samples are shown in FIG. 7. In this example, the target block consists of 8×8 crosshatched samples and reference samples are striped and dotted samples.

For the case of an inter coded block, reference samples for the matrix derivation are the same as the reference samples for motion compensation. In order to realize the shift operation, reference samples in the AMP block are sub-sampled such that the number of samples becomes the power-of-two. For example, the number of reference samples in a 12×16 block are reduced by ⅔.

According to the techniques of the current disclosure, the color-space transform process may be applied for each CU. Therefore, there is no need to signal whether the transform process is invoked or not. In addition, both the encoder and decoder sides derive the transform matrix with the same method to avoid the overhead for signaling the transform matrix.

According to techniques of the current disclosure, color-space transform processes, such as color-space transform matrices, are used. One such matrix is the YCbCr transform matrix, which is:

$$\text{Forward:} \begin{bmatrix} Y \\ Cb \\ Cr \end{bmatrix} = \begin{bmatrix} 0.2126 & 0.7152 & 0.0722 \\ -0.1172 & -0.3942 & 0.5114 \\ 0.5114 & -0.4645 & -0.0469 \end{bmatrix} \begin{bmatrix} R \\ G \\ B \end{bmatrix}$$

$$\text{Inverse:} \begin{bmatrix} R \\ G \\ B \end{bmatrix} = \begin{bmatrix} 1 & 0 & 1.5397 \\ 1 & -0.1831 & -0.4577 \\ 1 & 1.8142 & 0 \end{bmatrix} \begin{bmatrix} Y \\ Cb \\ Cr \end{bmatrix}$$

Another such matrix is the YCoCg transform matrix, which is:

$$\text{Forward:} \begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}$$

$$\text{Inverse:} \begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}$$

Another such matrix is the YCoCg-R matrix, which is a revised version of the YCoCg matrix which scales the Co and Cg components by a factor of two. By using a lifting technique, the forward and inverse transform could be achieved by the following equations:

$Co=R-B$ $t=B+\lfloor Co/2 \rfloor$ $Cg=G-t$ $Y=t+\lfloor Cg/2 \rfloor$             Forward:

$t=Y-\lfloor Cg/2 \rfloor$ $G=Cg+t$ $B=t-\lfloor Co/2 \rfloor$ $R=B+Co$             Inverse:

In the above equations and matrices, the forward transformations may be performed during the encoding process (e.g., by a video encoder), and the inverse transformations may be performed in the decoding process (e.g., by a video decoder).

In traditional video coding, images are assumed to have a continuous tone and be spatially smooth. Based on these assumptions, various tools have been developed (e.g., block-based transform, filtering, etc.) which have shown good performance for videos with natural content. However, in certain applications (e.g., a remote desktop, collaborative work displays, and wireless displays), computer generated screen content may be the dominant content to be compressed. This type of content tends to have a discrete tone and feature sharp lines and high-contrast object boundaries. The assumption of continuous-tone and smoothness may no longer apply and, thus, traditional video coding techniques may not work efficiently.

Palette mode coding may be used to overcome the above deficiencies. Examples of the palette coding techniques are described in U.S. Provisional Application Ser. No. 61/810, 649, filed Apr. 10, 2013. For each CU, a palette may be derived, which includes the most dominant pixel values in the current CU. The size and the elements of the palette are first transmitted. After the transmission, the pixels in the CU are encoded according to a certain scanning order. For each location, a syntax element, such as a flag, palette_flag, is first transmitted to indicate if the pixel value is in the palette ("run mode") or not ("pixel mode").

In "run mode", the palette index may be signaled, followed by the "run". The run is a syntax element which indicates the number of consecutive pixels in a scanning order that have the same palette index value as the pixel currently being coded. If multiple pixels in immediate succession in the scanning order have the same palette index value, then "run mode" may be indicated by the syntax element, such as palette_flag. A counter value may be determined, which equals the number of pixels succeeding the current pixel that have the same palette index value as the current pixel, and the run is set equal to the counter value. Neither palette_flag nor the palette index needs to be transmitted for the following positions that are covered by the "run" as they all have the same pixel value. On the decoder side, only the first palette index value for the current pixel would be decoded, and the result would be duplicated for each pixel in the "run" of pixels indicated in the "run" syntax element.

In "pixel mode", the pixel sample value is transmitted for this position. If the syntax element, such as palette_flag, indicates "pixel mode", then the palette index value is only determined for the one pixel being decoded.

Conventional techniques may suffer from various problems. For instance, a color-space transform may be invoked which does not take into account the sequence characteristics and local diversity. Therefore, the coding performance may be sub-optimal. In another example, the derivation of a transform matrix may be required at the decoder, which increases the decoder complexity significantly. Further, the transform matrix may be derived using either the spatial reconstructed pixels or the predictor of inter-coded PUs. However, the efficiency of the transform matrix may be reduced when the PU size is relatively small, the prediction is not very accurate, or the neighboring pixels are unavailable. Techniques of this disclosure may overcome one or more of these problems.

A video coder, such as video encoder 20 or video decoder 30, may execute techniques described in this disclosure. In general, this disclosure describes techniques for coding video blocks using a color-space conversion process. A video coder, such as video encoder 20 or video decoder 30, may determine a coding mode used to encode the video data. The coding mode may be one of a lossy coding mode or a lossless coding mode. The video coder may determine a color-space transform process dependent on the coding mode used to encode the video data. The video coder may apply the color-space transform process in encoding the video data. In decoding the video data, independent of whether the coding mode is the lossy coding mode or the lossless coding mode, the video coder may apply the same color-space inverse transform process in a decoding loop of the encoding process.

This disclosure describes techniques that may improve the coding performance of in-loop color-space transform and may reduce the decoder complexity. FIG. 1 is a block diagram illustrating an example video encoding and decoding system 10 that may utilize techniques for screen content coding, wherein high a chroma sampling format is used. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding video blocks using a color-space conversion process. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding video blocks using a color-space conversion process may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coder referred to as the HEVC Test Model (HM). The HM presumes several additional capabilities of video coders relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, a video coder, such as video encoder 20 or video decoder 30, may determine a coding mode used to encode the video data. The coding mode may be one of a lossy coding mode or a lossless coding mode. The video coder may determine a color-space transform process dependent on the coding mode used to encode the video data. The video coder may apply the color-space transform process in encoding the video data. In decoding the video data, independent of whether the coding mode is the lossy coding mode or the lossless coding mode, the video coder may apply the same color-space inverse transform process in a decoding loop of the encoding process.

A video coder, such as video encoder 20 or video decoder 30, may perform any of the techniques as described with relation to FIGS. 1-9. By using the same color-space inverse transform matrix, a video decoder may be able to more efficiently decode video data when color-space transformation is used. In different instances, it may be more efficient for a video encoder to use a lossy coding mode. In other instances, it may be more efficient for a video decoder to use a lossless coding mode. For higher picture quality, a lossless coding mode may be implemented on the decoding side, and a lossless coding matrix may be used on the decoder side regardless of whether the video data is coded with a lossy coding mode or a lossless coding mode. As such, it may add to the efficiency of a video decoder to implement the same lossless color-space inverse transform matrix regardless of whether the video data is coded with a lossy coding mode or a lossless coding mode, removing the step of determining whether the video data is coded with a lossy coding mode or a lossless coding mode, thereby increasing the overall coding efficiency of the system and reducing energy consumption.

A variety of syntax elements may be used in alignment with techniques of the current disclosure. These syntax elements may include:

|  | Descriptor |
| --- | --- |
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( sps_max_sub_layers_minus1 ) | |
|   ... | |
|   vui_parameters_present_flag | u(1) |
|   if( vui_parameters_present_flag ) | |
|     vui_parameters( ) | |
|   sps_extension_present_flag | u(1) |
|   if( sps_extension_present_flag ) { | |
|     for( i = 0; i < 1; i++) | |
|       sps_extension_flag[ i ] | u(1) |
|     sps_extension_7bits | u(7) |
|     if( sps_extension_flag[ 0 ] ) { | |
|       transform_skip_rotation_enabled_flag | u(1) |
|       transform_skip_context_enabled_flag | u(1) |
|       intra_block_copy_enabled_flag | u(1) |
|       implicit_rdpcm_enabled_flag | u(1) |
|       explicit_rdpcm_enabled_flag | u(1) |
|       extended_precision_processing_flag | u(1) |
|       intra_smoothing_disabled_flag | u(1) |
|       high_precision_offsets_enabled_flag | u(1) |
|       fast_rice_adaptation_enabled_flag | u(1) |
|       cabac_bypass_alignment_enabled_flag | u(1) |
|       color_transform_enabled_flag (new) | u(1) |
|     } | |
|     if( sps_extension_7bits ) | |
|       while( more_rbsp_data( ) ) | |
|         sps_extension_data_flag | u(1) |
|   } | |

|  | Descriptor |
|---|---|
|       rbsp_trailing_bits( ) | |
|    } | |
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( intra_block_copy_enabled_flag ) | |
|       intra_bc_flag[ x0 ][ y0 ] | ae(v) |
|     if( slice_type != I && !intra_bc_flag[ x0 ][ y0 ] ) | |
|       pred_mode_flag | ae(v) |
|     if( CuPredMode[ x0 ][ y0 ] != MODE_INTRA \|\| intra_bc_flag[ x0 ][ y0 ] \|\| | |
|       log2CbSize == MinCbLog2SizeY ) | |
|       part_mode | ae(v) |
|     if( CuPredMode[ x0 ][ y0 ] == MODE_INTRA ) { | |
|       if( PartMode == PART_2Nx2N && pcm_enabled_flag && | |
|       !intra_bc_flag[ x0 ][ y0 ] && | |
|       log2CbSize >= Log2MinIpcmCbSizeY && | |
|       log2CbSize <= Log2MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( x0, y0, log2CbSize ) | |
|     } else if( intra_bc_flag[ x0 ][ y0 ] ) { | |
|       mvd_coding( x0, y0, 2) | |
|       if( PartMode == PART_2NxN ) | |
|         mvd_coding( x0, y0 + ( nCbS / 2 ), 2) | |
|       else if( PartMode == PART_Nx2N ) | |
|         mvd_coding( x0 + ( nCbS / 2 ), y0, 2) | |
|       else if( PartMode == PART_NxN ) { | |
|         mvd_coding( x0 + ( nCbS / 2 ), y0, 2) | |
|         mvd_coding( x0, y0 + ( nCbS / 2 ), 2) | |
|         mvd_coding( x0 + ( nCbS / 2 ), y0 + ( nCbS / 2 ), 2) | |
|       } | |
|     } else { | |
|       pbOffset = ( PartMode == PART_NxN ) ? ( nCbS / 2 ) : nCbS | |
|       for( j = 0; j < nCbS; j = j + pbOffset ) | |
|         for( i = 0; i <nCbS; i = i + pbOffset ) | |
|           prev_intra_luma_pred_flag[ x0 + i ][ y0 + j ] | ae(v) |
|       for( j = 0; j < nCbS; j = j + pbOffset ) | |
|         for( i = 0; i < nCbS; i = i + pbOffset ) | |
|           if( prev_intra_luma_pred_flag[ x0 +i ][ y0 + j ] ) | |
|             mpm_idx[ x0 + i ][ y0 + j ] | ae(v) |
|           else | |
|             rem_intra_luma_pred_mode[ x0 + i ][ y0 + j ] | ae(v) |
|       if( ChromaArrayType == 3 ) | |
|         for( j = 0; j < nCbS; j = j + pbOffset ) | |
|           for( i = 0; i < nCbS; i = i + pbOffset ) | |
|             intra_chroma_pred_mode[ x0 + i ][ y0 + j ] | ae(v) |
|       else if( ChromaArrayType != 0 ) | |
|         intra_chroma_pred_mode[ x0 ][ y0 ] | ae(v) |
|     } | |
|     } else { | |
| ... | |
|     } | |
|     if( !pcm_flag[ x0 ][ y0 ] ) { | |
|       if( CuPredMode[ x0 ][ y0 ] != MODE_INTRA && | |
|       !( PartMode == PART_2Nx2N && merge_flag[ x0 ][ Y0 ] ) \|\| | |
|       ( CuPredMode[ x0 ][ y0 ] == MODE_INTRA && intra_bc_flag[ x0 ][ y0 ] ) ) | |
|         rqt_root_cbf | ae(v) |
|       if( rqt_root_cbf ) { | |
|         if( color_transform_enabled_flag ) (new) | |
|           color_transform_flag[ x0 ][ y0 ] (new) | ae(v) |
|         MaxTrafoDepth = ( CuPredMode[ x0 ][ y0 ] == MODE_INTRA ? | |
|                 ( max_transform_hierarchy_depth_intra + IntraSplitFlag ) : | |
|                 max_transform_hierarchy_depth_inter ) | |
|         transform_tree( x0, y0, x0, y0, log2CbSize, 0, 0 ) | |
|       } | |
|     } | |
|   } | |
| } | |

When the syntax element color_transform_enabled_flag is equal to 1, in-loop color-space transform process may be invoked in the decoding process. When the syntax element color_transform_enabled_flag is equal to 0, in-loop color-space transform may not be applied. When the syntax element is not present, the value of the syntax element color_transform_enabled_flag may be inferred to be equal to 0.

When the syntax element color_transform_flag[x0][y0] is equal to 1, the current coding unit may be coded with color-space transform. When the syntax element color_transform_flag[x0][y0] is equal to 0, the current coding unit is coded without color-space transform. When the syntax element is not present, the value of the syntax element color_transform_flag may be inferred to be equal to 0. The array indices x0 and y0 may specify the location (x0, y0) of a top-left luma sample of the considered coding block relative to the top-left luma sample of the picture.

In some examples, video coder, such as video encoder 20 or video decoder 30, may determine whether to use color-space conversion for a coding unit. The video coder may set a value of a syntax element of the coding unit to indicate the use of color-space conversion. The video coder may apply a color-space transform matrix to a residual block of the coding unit. The video coder may decode the syntax element of the coding unit, wherein the syntax element indicates whether the coding unit was encoded using color-space conversion. The video coder may determine whether a value of the syntax element indicates that the coding unit was encoded using color-space conversion. The video coder may apply a color-space inverse transform matrix to a residual block of the coding unit in response to determining that the syntax element indicates that the coding unit was coded using color-space conversion.

In one example, for intra-coded CUs, a flag may be directly signaled. Alternatively, for intra-coded CUs, a flag may be signaled only when the CU is not I-PCM mode. In another example, for inter-coded CUs and/or Intra BC-coded CUs, a flag may be signaled only when there are non-zero coefficients in the current CU, i.e. the rqt_root_cbf is equal to 1. In another example, the flag is not signaled when the CU is coded with palette mode. In all above examples, when the decoded color transform flag is equal to 0, or the flag is not present in the bit stream for one CU, the color-space transform process may be skipped.

Furthermore, one flag in either sequence parameter set (SPS)/picture parameter set (PPS)/slice header can be signaled to control the usage of color-space transform. When the flag in SPS/PPS/slice header is equal to 0, the signaling of CU-level flag may be skipped in all the CUs in the corresponding sequence/picture/slice, respectively. Alternatively, the color-space transform may be performed in PU-level or TU-level wherein each PU/TU has a flag to indicate the usage of color-space transform.

In one example, a modified YCoCg transform may be applied in the encoding and decoding process. The modified YCoCg transform may defined as follows:

$$\text{Forward: } \begin{bmatrix} Y \\ Co \\ Cg \end{bmatrix} = \begin{bmatrix} 1 & 2 & 1 \\ 2 & 0 & -2 \\ -1 & 2 & -1 \end{bmatrix} \begin{bmatrix} R \\ G \\ B \end{bmatrix},$$

Inverse: temp = $Y - Cg$;

$G = (Y + Cg + \text{offset}) >> 2$;

$B = (\text{temp} - Co + \text{offset}) >> 2$;

$R=(\text{temp}+Co+\text{offset})>>2$; wherein the offset is equal to 2.

Alternatively, the modified YCoCg transform may be defined as follows:

$$\text{Forward: } \begin{bmatrix} Y \\ Co \\ Cg \end{bmatrix} = \begin{bmatrix} 1/2 & 1 & 1/2 \\ 1 & 0 & -1 \\ -1/2 & 1 & -1/2 \end{bmatrix} \begin{bmatrix} R \\ G \\ B \end{bmatrix}$$

Inverse: temp = $Y - Cg$;

$G = (Y + Cg + \text{offset}) >> 1$;

$B = (\text{temp} - Co + \text{offset}) >> 1$;

$R = (\text{temp} + Co + \text{offset}) >> 1$; wherein the offset is equal to 1 or 0.

The corresponding quantization parameter used by CUs or blocks which are coded with color transform may be inferred to be equal to (dQP+2), while the one used by CUs or blocks without color transform may be inferred to be equal to dQP. Simultaneously, the bit-depth may be further increased by 1 in both quantization and transform processes.

Alternatively, two steps forward/inverse transform are applied with the original YCoCg transform unchanged plus a normalization process. For the forward transform, the original YCoCg forward transform is firstly applied. Then, for each component i, i.e., Y, Co and Cg, the component is reset to (i*forward_factor+offset)>>BIT_PRECISION wherein BIT_PRECISION is an unsigned integer and forward_factor is dependent on BIT_PRECISION. In one example, forward_factor is equal to 1/√6*(1<<BITS_TRANS)+0.5, BIT_PRECISION is equal to 15, offset is equal to (1<<(BIT_PRECISION−1)).

For the inverse transform, the original YCoCg inverse transform is firstly applied. Then, for each component i, i.e., Y, Co and Cg, the component is reset to (i*backward_factor+offset)>>BIT_PRECISION wherein BIT_PRECISION is the same as used in the forward transform, and backward_factor is dependent on BIT_PRECISION. In one example, backward_factor is equal to √6/4*(1<<BITS_TRANS)+0.5), offset is equal to (1<<(BIT_PRECISION−1)).

Alternatively/furthermore, the CU-level flag may be signaled only when at least one of the coded block flags in three color components (i.e., cbf_luma, cbf_cb and cbf_cr) is equal to 1. Alternatively, the modified residual after color-space transform may be further modified to make sure the range of residual in CUs or blocks with color-space transform is the same as that of residual in CUs/blocks without color-space transform. In one example, a clip operation is applied.

Color-space transform matrix may be independent from the reconstructed pixels. Instead, it may be dependent on the lossy or lossless coding mode. In one example, when CU is coded with lossy mode, YCoCg may be applied while YCoCg-R is applied when the CU is coded with lossless mode. Moreover, when YCoCg-R is applied, the bit depth of Co and Cg components may be increased by 1. In another example, the transform matrix can be dependent on the intra, inter/Intra BC modes. In this case, a predefined matrix for each mode may be specified both at the encoder and decoder and the same matrix may be used both at the encoder and decoder according to the coding mode when CU-level flag is 1. Furthermore, the CU-level flag may be signaled only when at least one of the coded block flags in three color components (i.e., cbf_luma, cbf_cb and cbf_cr) is equal to 1.

Techniques of the current disclosure may also include a transform matrix derivation and signaling method, such as in frame-level. In one example, for each frame, a transform matrix may be derived based on the statistics across the color components in the original image. The transform matrix can be coded into a bitstream and directly transmitted to the decoder. Alternatively, transform matrix prediction between consecutively coded frames may be applied. For example, one flag may be transmitted to indicate whether the matrix is the same as that used in the previous frame. Alternatively, a transform matrix could be derived based on a set of original frames and signaled in the bitstream.

In another example, a set of transform matrices are derived and signaled in the high-level syntax, such as PPS. In one example, the image is classified into multiple regions based on the characteristics, and for each region, a transform matrix is derived. The derived matrices can be coded and signaled in the high-level syntax. The index of the selected transform matrix is further signaled in CU/TU/PU level. Alternatively, the index of the selected transform matrix is signaled in slice header or for each tile region. Alternatively, the transform matrix may be derived in slice header or for each tile region.

When the bit-depth of luma and chroma components are different, the bit-depth of all color components may firstly be modified to be same, then the color transform may be applied afterward. Alternatively, the bitstream may conform to a constraint that, when the bit-depth of luma and chroma components are different in the coded bitstream, the color transform shall be disabled (i.e. color_transform_enabled_flag equal to 0).

Different QPs may be applied to CUs/blocks which are coded with or without color transform, and/or the bit-depth used in quantization and transform process can be modified because of such a non-normalized color transform. In one example, when the above modified YCoCg transform is used, the following steps (i.e., Scaling, transformation and array construction process prior to deblocking filter process) are further modified based on color_transform_flag.

In one example, when the modified YCoCg transform, as described above, is used, the corresponding quantization parameter derivation process and inverse transform process are modified accordingly. Inputs to this process may include a luma location (xCb, yCb) specifying the top-left sample of the current luma coding block relative to the top-left luma sample of the current picture. In this process, the variable QpY, the luma quantization parameter Qp'Y, and the chroma quantization parameters Qp'Cb and Qp'Cr may be derived. The luma location (xQg, yQg) may specify the top-left luma sample of the current quantization group relative to the top left luma sample of the current picture. The horizontal and vertical positions xQg and yQg may be set equal to xCb−(xCb&((1<<Log 2MinCuQpDeltaSize)−1)) and yCb−(yCb&((1<<Log 2MinCuQpDeltaSize)−1)), respectively. The luma size of a quantization group, Log 2MinCuQpDeltaSize, may determine the luma size of the smallest area inside a coding tree block that shares the same qPY_PRED.

The variable QpY may be derived as follows:

$$QpY=((qPY\_PRED+CuQpDeltaVal+52+2*QpBdOffsetY)\%(52+QpBdOffsetY))-QpBdOffsetY$$

The luma quantization parameter Qp'Y may be derived as follows:

$$Qp'Y=QpY+QpBdOffsetY$$

When the syntax element ChromaArrayType is not equal to 0, the following may apply:

The variables qPiCb and qPiCr may be derived as follows:

$$qPiCb=\text{Clip3}(-QpBdOffsetC,57,QpY+pps\_cb\_qp\_offset+slice\_cb\_qp\_offset+CuQpAdjValCb)$$

$$qPiCr=\text{Clip3}(-QpBdOffsetC,57,QpY+pps\_cr\_qp\_offset+slice\_cr\_qp\_offset+CuQpAdjValCr)$$

If the syntax element ChromaArrayType is equal to 1, the variables qPCb and qPCr may be set equal to the value of QpC as specified in the below table based on the index qPi equal to qPiCb and qPiCr, respectively. Otherwise, the variables qPCb and qPCr are set equal to Min(qPi, 51), based on the index qPi equal to qPiCb and qPiCr, respectively.

TABLE 2

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qpc | = qPi | 29 | 30 | 31 | 32 | 33 | 33 | 34 | 34 | 35 | 35 | 36 | 36 | 37 | 37 | = qPi − 6 |

The chroma quantization parameters for the Cb and Cr components, Qp'Cb and Qp'Cr, may be derived as follows:

$$Qp'Cb=qPCb+QpBdOffsetC$$

$$Qp'Cr=qPCr+QpBdOffsetC$$

When color_transform_flag is equal to 1, the following may apply:

$$Qp'Y=(Qp'Y+8)$$

When ChromaArrayType≠0, $Qp'Cb=(Qp'cb+8)$ and $Qp'Cr=(Qp'cr+8)$ $$\text{BitDepth}Y=(\text{BitDepth}Y+2)$$

$$\text{BitDepth}C=(\text{BitDepth}C+2)$$

Inputs to this process may include a luma location (xTbY, yTbY) specifying the top-left sample of the current luma transform block relative to the top left luma sample of the current picture, a variable nTbS specifying the size of the current transform block, a variable cIdx specifying the colour component of the current block, and a variable qP specifying the quantization parameter. Output of this process may include the (nTbS)×(nTbS) array d of scaled transform coefficients with elements d[x][y].

The variables log 2TransformRange, bdShift, coeffMin and coeffMax may be derived as follows:

When color_transform_flag=1, the following applies:

Coeff CTMinY=−(1<<(extended_precision_processing_flag?

Max(15,BitDepthY+6):15))

Coeff CTMinC=−(1<<(extended_precision_processing_flag?

Max(15,BitDepthC+6):15))

CoeffCTMaxY=(1<<(extended_precision_processing_flag?

Max(15,BitDepth$Y$+6):15))−1

Coeff $CT$Max$C$=(1<<(extended_precision_processing_flag?

Max(15,BitDepth$C$+6):15))−1

If $cIdx$=0, log 2TransformRange=extended_precision_processing_flag?

Max(15,BitDepth$Y$+6):15

$bd$Shift=BitDepth$Y$+Log 2($nTbS$)+10−log 2TransformRange coeffMin=(color_transform_flag? Coeff $CT$Min$Y$: CoeffMin$Y$)

coeffMax=(color_transform_flag? Coeff $CT$Max$Y$: CoeffMax$Y$)

Otherwise, log 2TransformRange=extended_precision_processing_flag?

Max(15,BitDepth$C$+6):15

$bd$Shift=BitDepth$C$+Log 2($nTbS$)+10−log 2TransformRange coeffMin=(color_transform_flag? Coeff $CT$Min$C$: CoeffMin$C$)

coeffMax=(color_transform_flag? Coeff $CT$Max$C$: CoeffMax$C$)

The list levelScale[ ] may be specified as levelScale[k]={40, 45, 51, 57, 64, 72} with k=0 . . . 5.

For the derivation of the scaled transform coefficients d[x][y] with x=0 . . . nTbS−1, y=0 . . . nTbS−1, the following may apply:

The scaling factor m[x][y] may be derived as follows:
If one or more of the following conditions are true, m[x][y] is set equal to 16:
  scaling_list_enabled_flag=0.
  transform_skip_flag[xTbY][yTbY]=1 and nTbS>4.
Otherwise the following applies:

$m[x][y]$=ScalingFactor[sizeId][matrixId][x][y]    (8-283)

When the syntax element sizeId is specified for the size of the quantization matrix equal to (nTbS)×(nTbS) and matrixId is specified in Table 7-4 for sizeId, CuPredMode [xTbY][yTbY], and cIdx, respectively, then the scaled transform coefficient d[x][y] may be derived as follows:

$d[x][y]$=Clip3(coeffMin,coeffMax,((TransCoeffLevel
 [$xTbY$][$yTbY$][$cIdx$][x][y]*m[x][y]*levelScale
 [$qP$%6]<<($qP$/6))+(1<<($bd$Shift−1)))>>$bd$Shift)

When color_transform_flag is equal to 1, the following may apply:

BitDepth$Y$=BitDepth$Y$−2

BitDepth$C$=BitDepth$C$−2

In one example, when color-space transform is applied to intra modes, the residue is derived in the converted color-space domain. That is, before invoking the intra sample prediction process, the neighboring pixels of the current CU may be first converted to another sub-optimal color-space with a modified forward YCoCg or YCoCg-R transform. The modified neighboring pixels may then be used to derive the predictor of the current CU. The residual (i.e., prediction error) is derived from the current CU and the current CU's neighboring pixels in the sub-optimal domain. The residual is coded in the same way as conventional coding flow, such as inter-component residual prediction, transform, quantization and entropy coding. After entropy coding, the transform coefficients may be further modified with the inverse YCoCg or YCoCg-R transform. The modified transform coefficients may then be added to the predictor to derive the reconstructed pixels of the current CU. After the reconstruction process is invoked, the inverse YCoCg or YCoCg-R transform may be applied to the modified neighboring pixels. Therefore, at the decoder side, before invoking the reconstruction process, one additional process may be applied wherein the inverse color-space transform is applied to the derived transform coefficients.

When color-space transform is applied to intra modes, instead of generating the residue by subtracting the predictor from the current block in the converted color domain, the residue may be generated using the pixels before color-space transform, followed by the color-space transform. In this case, the luma and chroma intra modes can be set to the identical mode. Alternatively, the signaling of the chroma mode may be skipped. Alternatively, the color transform flag may be signaled only when the luma and chroma intra modes are same.

As described above, in some examples, the lossless and lossy coding methods may share the same matrix, for example, YCoCg-R. Additionally or alternatively, when the YCoCg-R transform is applied to lossy coding, the bit-depth of chroma components of blocks with color transform may be increased by 1 compared to blocks without color transform. The luma component QP of blocks with color transform may be equal to that of blocks without color transform minus 4. In one example, the two chroma components QP of blocks with color transform may be equal to chroma/luma component QP of blocks without color transform plus 2. In one example, the Cg chroma components QP of blocks with color transform may be equal to the luma/chroma component QP of blocks without color transform plus 2. The Co chroma components QP of blocks with color transform may be equal to the luma/chroma component QP of blocks without color transform plus 3.

In such examples, when YCoCg-R is used for both lossy and lossless mode, if current block is lossy coded, the bit-depth of luma and chroma may be the same for those blocks coded without enabling adaptive color transform. In this case, when lossy coding is applied, after the forward transform of YCoCg-R, the Co and Cg components may be scaled by N-bit right shift to reduce the increased bit-depth due to the forward YCoCg-R transform and make the bit-depth precision the same as the bit-depth precision of the Y component. In addition, before performing the reverse YCoCg-R transform, Co and Cg component may be modified with N-bit left shift. In one example, N is equal to 1.

In one example, it may be assumed that the input bit-depth of luma and chroma components are the same. For the lossy coding mode, shifting operations may be applied to the two chroma components (i.e., Cg, Co) after the forward transform, and before the inverse transform. In one example, the following process is applied in order:

1. Forward YCoCg-R is unchanged:

$Co$=$R$−$B$ $t$=$B$+[$Co$/2]

$Cg$=$G$−$t'$ $Y$=$t$+[$Cg$/2]

2. If current block is coded in lossy mode, the following may further apply:

$$Cg=Cg>>1;$$

$$Co=Co>>1;$$

In another example, an offset may be considered in the right shift process. For example, the above highlighted equations could be replaced by:

$$Cg=(Cg+1)>>1;$$

$$Co=(Co+1)>>1;$$

Before invoking the reverse YCoCg-R transform, the following may apply:

If current block is coded in lossy mode, the following may apply:

$$Cg=Cg<<1;$$

$$Co=Co<<1;$$

And the inverse YCoCg-R may remain unchanged:

$$t=Y-[Cg/2]$$

$$G=Cg+t$$

$$B=t-[Co/2]$$

$$R=B+Co$$

In such examples, a residual modification process for transform blocks using adaptive colour transform may be invoked when ChromaArrayType is equal to 3. Inputs to this process may include a variable blkSize specifying the block size, an (blkSize)×(blkSize) array of luma residual samples rY with elements rY[x][y], an (blkSize)×(blkSize) array of chroma residual samples rCb with elements rCb[x][y], and an (blkSize)×(blkSize) array of chroma residual samples rCr with elements rCr[x][y]. Outputs to this process may include a modified (blkSize)×(blkSize) array $r_Y$ of luma residual samples, a modified (blkSize)×(blkSize) array $r_{Cb}$ of chroma residual samples, and a modified (blkSize)×(blkSize) array $r_{Cr}$ of chroma residual samples.

The (blkSize)×(blkSize) arrays of residual samples $r_Y$, $r_{Cb}$ and $r_{Cr}$ with x=0 ... blkSize−1, y=0 ... blkSize−1 may be modified as follows:

If $cu\_transquant\_bypass\_flag=0, r_{Cb}[x][y]=r_{Cb}[x][y]-1$
and $r_{Cr}[x][y]=r_{Cr}[x][y]-1$ $$tmp=r_Y[x][y]-(r_{Cb}[x][y]>>1)$$

$$r_Y[x][y]=tmp+r_{Cb}[x][y]$$

$$r_{Cb}[x][y]=tmp-(r_{Cr}[x][y]>>1)$$

$$r_{Cr}[x][y]=r_{Cb}[x][y]+r_{Cr}[x][y]$$

Alternatively, 'if cu_transquant_bypass_flag is equal to 0, $r_{Cb}[x][y]=r_{Cb}[x][y]<<1$ and $r_{Cr}[x][y]=r_{Cr}[x][y]<<1$' could be replaced by '$r_{Cb}[x][y]=r_{Cb}[x][y]<<(1-cu\_transquant\_bypass\_flag)$ and $r_{Cr}[x][y]=r_{Cr}[x]$ $[y]-(1-cu\_transquant\_bypass\_flag)$'.

In another example of a lossy coding method and a lossless coding method sharing a color-transform matrix, the input bit-depth of luma and chroma components may be different. In such an example, when the input bit depths of luma and chroma components are different and YCoCg-R is used for both lossy and lossless coding modes, before the inverse transform, at least one of the values of Y, Co, Cg component may first be shifted N bits to make all three components have same bit-depth precision. In addition, one more bit may be shifted to the two chroma components (i.e., Co, and Cg). At least one of the prediction values of all three components may be modified to have the same bit-depth precision before invoking forward YCoCg-R transform. And after the forward transform, the two chroma components may be right shifted with 1 bit. For lossless coding modes, the different bit-depth may not be considered and, therefore, the adaptive color-space transform may be disabled. In one example, the bitstream may include a constraint that, when the bit-depth of luma and chroma components are different in the coded bitstream, the color transform shall be disabled (i.e. color_transform_enabled_flag equal to 0).

In this example, a residual modification process for transform blocks using adaptive colour transform may be invoked when ChromaArrayType is equal to 3. Inputs to this process may include a variable blkSize specifying the block size, a (blkSize)×(blkSize) array of luma residual samples rY with elements rY[x][y], a (blkSize)×(blkSize) array of chroma residual samples rCb with elements rCb[x][y], and a (blkSize)×(blkSize) array of chroma residual samples rCr with elements rCr[x][y]. Outputs to this process may include a modified (blkSize)×(blkSize) array $r_Y$ of luma residual samples, a modified (blkSize)×(blkSize) array $r_{Cb}$ of chroma residual samples, and a modified (blkSize)×(blkSize) array $r_{Cr}$ of chroma residual samples.

The variables deltaBD$_Y$ and deltaBD$_C$ may be derived as follows:

$$BitDepthMax=Max(BitDepthY, BitDepthC)$$

$$deltaBDY=cu\_transquant\_bypass\_flag?0:BitDepthMax-BitDepthY$$

$$deltaBDC=cu\_transquant\_bypass\_flag?0:BitDepthMax-BitDepthC$$

$$OY=cu\_transquant\_bypass\_flag\|(BitDepthMax==BitDepthY)?0:1<<(deltaBDY-1)$$

$$OC=cu\_transquant\_bypass\_flag\|(BitDepthMax==BitDepthc)?0:1<<(deltaBDc-1)$$

The (blkSize)×(blkSize) arrays of residual samples $r_Y$, $r_{Cb}$ and $r_{Cr}$
with x=0 ... blkSize−1, y=0 ... blkSize−1 may be modified as follows:
Residual samples rY[x][y], rCb[x][y] and rCr[x][y] may be modified as follows:

$$rY[x][y]=rY[x][y]<<deltaBDY$$

$$rCb[x][y]=rCb[x][y]<<(deltaBDC+1-cu\_transquant\_bypass\_flag)$$

$$rCr[x][y]=rCr[x][y]<<(deltaBDC+1-cu\_transquant\_bypass\_flag)$$

$$tmp=rY[x][y]-(rCb[x][y]>>1)$$

$$rY[x][y]=tmp+rCb[x][y]$$

$$rCb[x][y]=tmp-(rCr[x][y]>>1)$$

$$rCr[x][y]=rCb[x][y]+rCr[x][y]$$

$$rY[x][y]=(rY[x][y]+OY)>>deltaBDY$$

$$rCb[x][y]=(rCb[x][y]+Oc)>>deltaBDC$$

$$rCr[x][y]=(rCr[x][y]+Oc)>>deltaBDC$$

In the above examples, the function Max may be used to derive the larger value between two variables. Alternatively, at least one of the rounding offsets $O_Y$ and $O_c$ may be set equal to 0.

Alternatively, even for lossless coding, when the bit-depth of luma and chroma components are different, the components may be shifted to the same bit-depth precision, if needed. At the encoder side, after the forward transform, there may be no need to shift back to the original bit-depth precision. In other words, the coded residual of the three components may be of the same bit-depth to make sure it is lossless coding. Different from lossy coding, the inputs may not be modified before invoking backward YCoCg-R transform for lossless coding. The right shift may still be needed to make sure the outputs are in the same bit-depth as the original inputs.

In this example, a residual modification process for transform blocks using adaptive colour transform may be invoked when ChromaArrayType is equal to 3. Inputs to this process may include a variable blkSize specifying the block size, a (blkSize)×(blkSize) array of luma residual samples rY with elements rY[x][y], a (blkSize)×(blkSize) array of chroma residual samples rCb with elements rCb[x][y], and a (blkSize)×(blkSize) array of chroma residual samples rCr with elements rCr[x][y]. Outputs to this process may include a modified (blkSize)×(blkSize) array $r_Y$ of luma residual samples, a modified (blkSize)×(blkSize) array $r_{Cb}$ of chroma residual samples, and an modified (blkSize)×(blkSize) array $r_{Cr}$ of chroma residual samples.

The variables deltaBD$_Y$ and deltaBD$_C$ may be derived as follows:

BitDepthMax=Max(BitDepth*Y*,BitDepth*C*)

delta*BDY*=BitDepthMax−BitDepth*Y* delta*BDC*=BitDepthMax−BitDepth*C*

*OY*=(BitDepthMax==BitDepth*Y*)?0:1<<(delta*BDY*−1)

*OC*=(BitDepthMax==BitDepth*c*)?0:1<<(delta*BDc*−1)

The (blkSize)×(blkSize) arrays of residual samples $r_Y$, $r_{Cb}$ and $r_{Cr}$
with x=0 . . . blkSize−1, y=0 . . . blkSize−1 may be modified as follows:
When cu_transquant_bypass_flag is equal to 0, residual samples rY[x][y], rCb[x][y] and rCr[x][y] may be modified as follows:

*rY*[*x*][*y*]=*rY*[*x*][*y*]<<delta*BDY*

*rCb*[*x*][*y*]=*rCb*[*x*][*y*]<<(delta*BDC*+1−*cu*_transquant_ bypass_flag)

*rCr*[*x*][*y*]=*rCr*[*x*][*y*]<<(delta*BDC*+1−*cu*_transquant_ bypass_flag)

*tmp*=*rY*[*x*][*y*]−(*rCb*[*x*][*y*]>>1)

*rY*[*x*][*y*]=*tmp*+*rCb*[*x*][*y*]

*rCb*[*x*][*y*]=*tmp*−(*rCr*[*x*][*y*]>>1)

*rCr*[*x*][*y*]=*rCb*[*x*][*y*]+*rCr*[*x*][*y*]

*rY*[*x*][*y*]=(*rY*[*x*][*y*]+*OY*)>>delta*BDY*

*rCb*[*x*][*y*]=(*rCb*[*x*][*y*]+*Oc*)>>delta*BDC*

*rCr*[*x*][*y*]=(*rCr*[*x*][*y*]+*Oc*)>>delta*BDC*

Alternatively, one of $O_Y$ and $O_C$ may be equal to 0.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
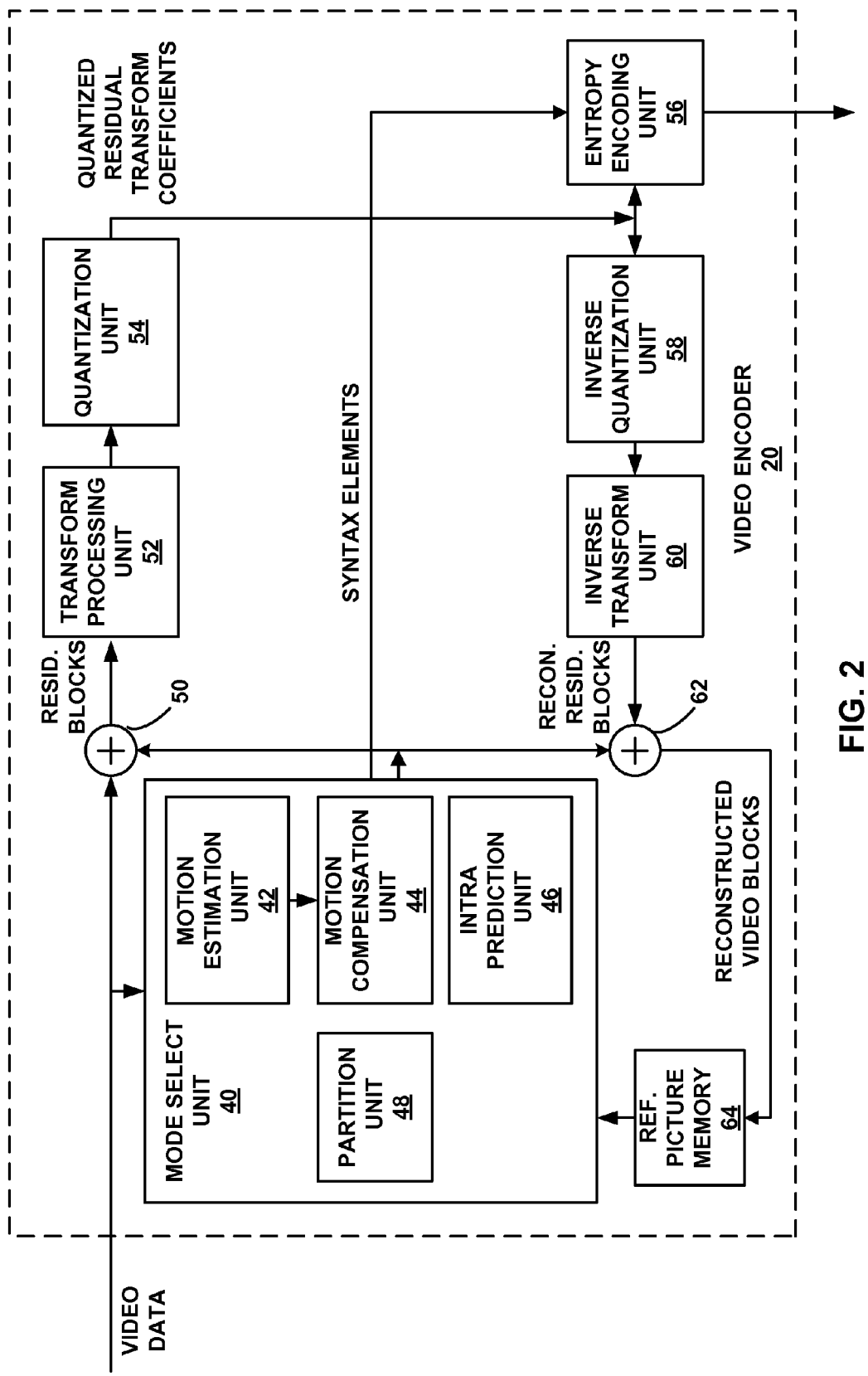
FIG. 2 is block diagram illustrating an example video encoder that may implement the techniques described in this disclosure.

FIG. 2 is a block diagram illustrating an example of video encoder 20 that may implement techniques for encoding video blocks using a color-space conversion process. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

In accordance with techniques of this disclosure, entropy encoding unit 56 of video encoder 20 may perform one or more techniques of the current disclosure. For example, entropy encoding unit 56 of video encoder 20 may determine a coding mode used to encode the video data. The coding mode may be one of a lossy coding mode or a lossless coding mode. Entropy encoding unit 56 may further determine a color-space transform process dependent on the coding mode used to encode the video data. Entropy encoding unit 56 of video encoder 20 may further apply the color-space transform process to the video data. Entropy encoding unit 56 of video encoder 20 may further apply a color-space inverse transform process in a decoding loop of the encoding process. In the techniques of this disclosure, the color-space inverse transform process is independent of whether the coding mode is the lossy coding mode or the lossless coding mode.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, entropy encoding unit 56 of video encoder 20 may perform one or more techniques of the current disclosure. For example, entropy encoding unit 56 of video encoder 20 may perform one or more techniques of the current disclosure. For example, entropy encoding unit 56 of video encoder 20 may determine a coding mode used to encode the video data. The coding mode may be one of a lossy coding mode or a lossless coding mode. Entropy encoding unit 56 may further determine a color-space transform process dependent on the coding mode used to encode the video data. Entropy encoding unit 56 of video encoder 20 may further apply the color-space transform process to the video data. Entropy encoding unit 56 of video encoder 20 may further apply a color-space inverse transform process in a decoding loop of the encoding process. In the techniques of this disclosure, the color-space inverse transform process is independent of whether the coding mode is the lossy coding mode or the lossless coding mode.

In some examples, the coding mode may be the lossy coding mode. In such examples, the color-space transform process may be a YCoCg matrix. Entropy encoding unit 56 of video encoder 20 may modify a Co component and a CG component of the YCoCg matrix with an N-bit left shift before applying the color-space inverse transform process in the decoding loop of the encoding process. In some examples, N may equal 1.

In other examples, the coding mode may be the lossless coding mode. In such examples, the color-space transform process may be a YCoCg-R matrix. Entropy encoding unit 56 of video encoder 20 may increase a bit depth of a Co component and a Cg component of the YCoCg-R matrix by 1.

In either of the two above examples, the color-space inverse transform process may be a lossless color-space inverse transform process. In such examples, the lossless color-space inverse transform process may comprise a YCoCg-R matrix.

In some examples, entropy encoding unit 56 of video encoder 20 may further determine to use color-space conversion for encoding the video data. In doing so, entropy encoding unit 56 of video encoder 20 may set a value of a syntax element of the video data to indicate the use of color-space conversion in response to determining to use color-space conversion for the coding unit. In some examples, the syntax element comprises a one-bit flag. In some examples, the syntax element is signaled when the coding unit is coded using a mode other than intra-pulse code modulation (IPCM) mode. In other examples, the syntax element is signaled only when there are non-zero coefficients in a transform unit of the coding unit. In some examples, a value of 1 for the syntax element indicates that the coding unit was encoded using color-space conversion.

In some examples, the syntax element may not be signaled. For instance, the syntax element may not be signaled when the coding unit is intra coded and when a luma prediction mode and a chroma prediction mode of a prediction unit within the coding unit are different. In another example, the syntax element may not be signaled when the coding unit is coded with a palette mode.

In some examples, the syntax element is a first syntax element and the video data is a first set of video data. In such examples, entropy encoding unit 56 of video encoder 20 may determine a value of a palette index for a first pixel in a second coding unit of a second set of video data. Entropy encoding unit 56 of video encoder 20 may further determine values of palette indexes for one or more next pixels in a scanning order immediately succeeding the first pixel. Determining the values of the palette indexes may comprise determining the values of the palette indexes until a pixel has a palette index with a value different than the value of the palette index for the first pixel. Entropy encoding unit 56 of video encoder 20 may further determine a number of palette index values determined for the next pixels. Based on the number of palette index values, entropy encoding unit 56 of video encoder 20 may encode the palette index using either a first mode or a second mode. When the number of palette index values is greater than one, entropy encoding unit 56 of video encoder 20 may set a value of a second syntax element to indicate that the first mode was used to encoding the palette index and set a value of a third syntax element equal to the number of palette index values. When the number of palette index values is less than or equal to one, entropy encoding unit 56 of video encoder 20 may set the value of the second syntax element to indicate that the second mode was used to encoding the palette index. In some examples, the first mode is a run mode, and the second mode is a pixel mode.

In some examples, encoding the syntax element may comprise entropy encoding unit 56 of video encoder 20 encoding data of a supplemental enhancement information (SEI) message that indicates whether the coding unit was encoded using color-space conversion.

Figure 3:
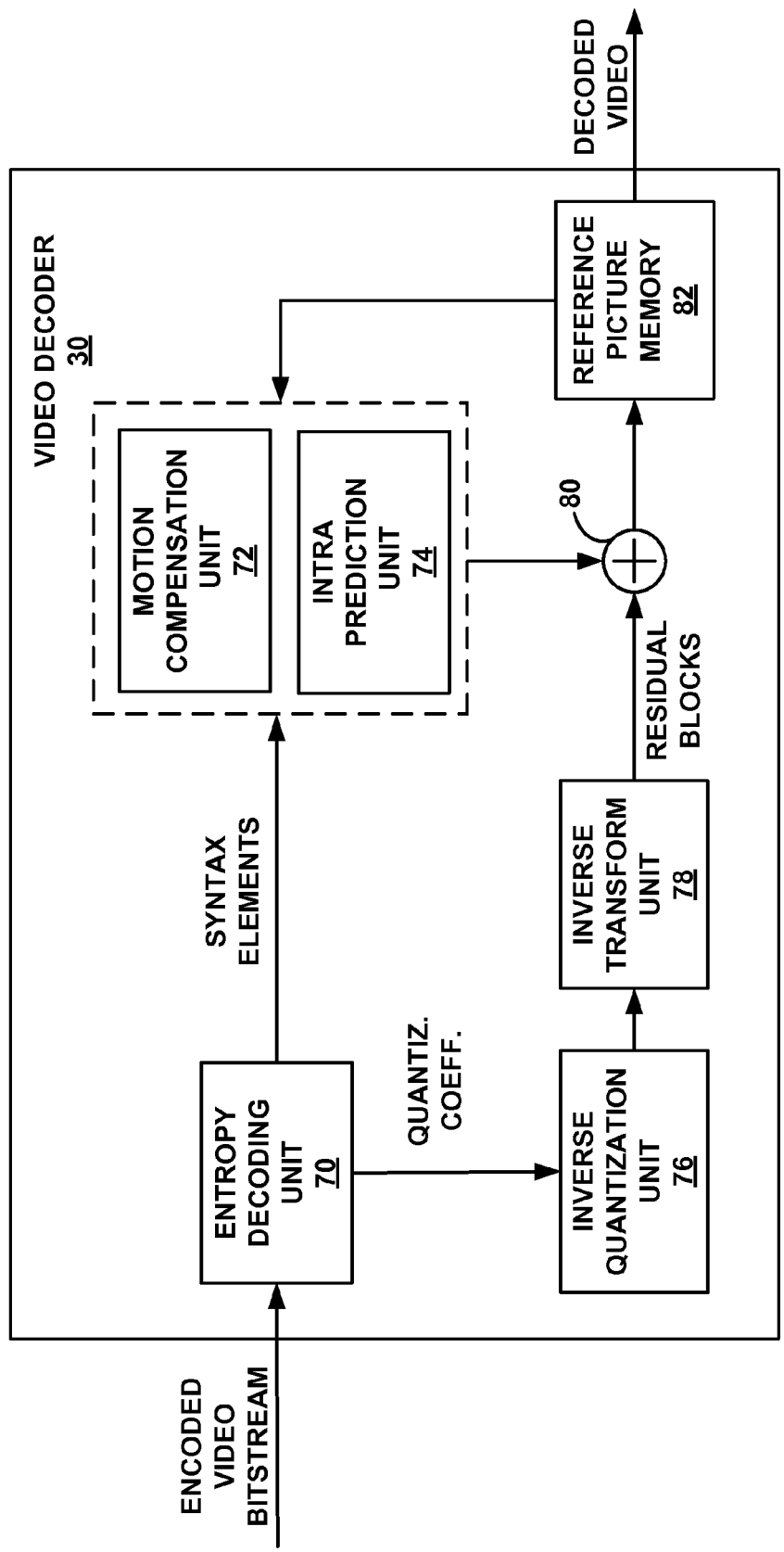
FIG. 3 is a block diagram illustrating an example video decoder that may implement the techniques described in this disclosure.

FIG. 3 is a block diagram illustrating an example of video decoder 30 that may implement techniques for decoding video blocks, some of which were encoded using a color-space conversion process. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

In accordance with techniques of this disclosure, entropy decoding unit 70 of video decoder 30 may perform one or more techniques of the current disclosure. For example, entropy decoding unit 70 of video decoder 30 may receive a first encoded block of video data. The first encoded block of video data was encoded using a lossy coding mode and a first color-space transform process. Entropy decoding unit 70 of video decoder 30 may further receive a second encoded block of video data. The second encoded block of video data was encoded using a lossless coding mode and a second color-space transform process. Entropy decoding unit 70 of video decoder 30 may further a color-space inverse transform process to the first encoded block of video data. Entropy decoding unit 70 of video decoder 30 may further apply the same color-space inverse transform process to the second encoded block of video data. On the decoder side, there may be no need to perform a color-space forward transform process, regardless of the coding mode. In some examples, the color-space inverse transform process may be fixed.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, entropy decoding unit 70 of video decoder 30 may perform one or more techniques of the current disclosure. For example, entropy decoding unit 70 of video decoder 30 may receive a first encoded block of video data. The first encoded block of video data was encoded using a lossy coding mode and a first color-space transform process. Entropy decoding unit 70 of video decoder 30 may further receive a second encoded block of video data. The second encoded block of video data was encoded using a lossless coding mode and a second color-space transform process. Entropy decoding unit 70 of video decoder 30 may further a color-space inverse transform process to the first encoded block of video data. Entropy decoding unit 70 of video decoder 30 may further apply the same color-space inverse transform process to the second encoded block of video data. On the decoder side, there may be no need to perform a color-space forward transform process, regardless of the coding mode. In some examples, the color-space inverse transform process may be fixed. In some examples, the blocks of video data may be coding units.

In some examples, entropy decoding unit 70 of video decoder 30 may further modify one or more components of the first encoded block of video data with an N-bit right shift or an N-bit left shift. In some examples, N may be equal to 1. In some examples, the one or more components of the first encoded block of video data may be two chroma components.

In some examples, the first color-space transform process comprises a YCoCg matrix. In further examples, the second color-space transform process comprises a YCoCg-R matrix. In either example, the color-space inverse transform process may comprise a lossless color-space inverse transform process. In some examples, the lossless color-space inverse transform process comprises a YCoCg-R matrix.

In some examples, entropy decoding unit 70 of video decoder 30 may decode a syntax element of a coding unit of video data. The syntax element may indicate whether the coding unit was encoded using color-space conversion. In some examples, the syntax element may comprise a one-bit flag. In some examples, the coding unit is coded in a mode other than intra-pulse code modulation (IPCM) mode and the syntax element is signaled only for coding units using a mode other than the IPCM mode. In some examples, the syntax element indicates that the coding unit was encoded using color-space conversion when there are non-zero coefficients in a transform unit of the coding unit. In some examples, a value of 1 for the syntax element indicates that the coding unit was encoded using color-space conversion. Entropy decoding unit 70 of video decoder 30 may further determine whether a value of the syntax element indicates that the coding unit was encoded using color-space conversion. In response to determining that the syntax element indicates that the coding unit was coded using color-space conversion, entropy decoding unit 70 of video decoder 30 may apply the color-space inverse transform process.

In some examples, the syntax element may indicate that color-space conversion was not used for encoding the coding unit. For instance, the syntax element may indicate that color-space conversion was not used for encoding the coding unit when the coding unit is intra coded and when a luma prediction mode and a chroma prediction mode of a prediction unit within the coding unit are different. In another example, the syntax element may indicate that color-space conversion was not used for encoding the coding unit when the coding unit is coded with a palette mode. In these examples, the syntax element may not be present in a received bitstream that comprises the video data, and decoding the syntax element may comprise inferring the value of the syntax element.

In some examples, the syntax element is a first syntax element and the video data is a first set of video data. In such examples, entropy decoding unit 70 of video decoder 30 may further determine a value of a second syntax element of a second set of video data. The second syntax element may indicate whether a palette mode was used for encoding the second set of video data. In response to the second syntax element indicating that the palette mode was used for encoding the video data, entropy decoding unit 70 of video decoder 30 may determine a value of a third syntax element. The third syntax element may indicate whether a first mode or a second mode is used for decoding a palette index for a pixel in the coding unit. Based on the determined value of the second syntax element, entropy decoding unit 70 of video decoder 30 may decode the palette index using either the first mode or the second mode. When using the first mode, entropy decoding unit 70 of video decoder 30 may determine a value of the palette index, determine a value of a fourth syntax element that indicates a number of pixels in a scanning order immediately succeeding the pixel currently being decoded, and duplicate the result of determining the value of the palette index for the next N pixels in the scanning order, with N equaling the value of the fourth syntax element. In some examples, the first mode is a run mode. When using the second mode, entropy decoding unit 70 of video decoder 30 may determine the value of the palette index and output a pixel sample value for the pixel, where the pixel sample value is equal to the value of the palette index. In some examples, the second mode is a pixel mode.

In some examples, decoding the syntax element comprises entropy decoding unit 70 of video decoder 30 being configured to decode data of a supplemental enhancement information (SEI) message that indicates whether the coding unit was encoded using color-space conversion.

Figure 4:
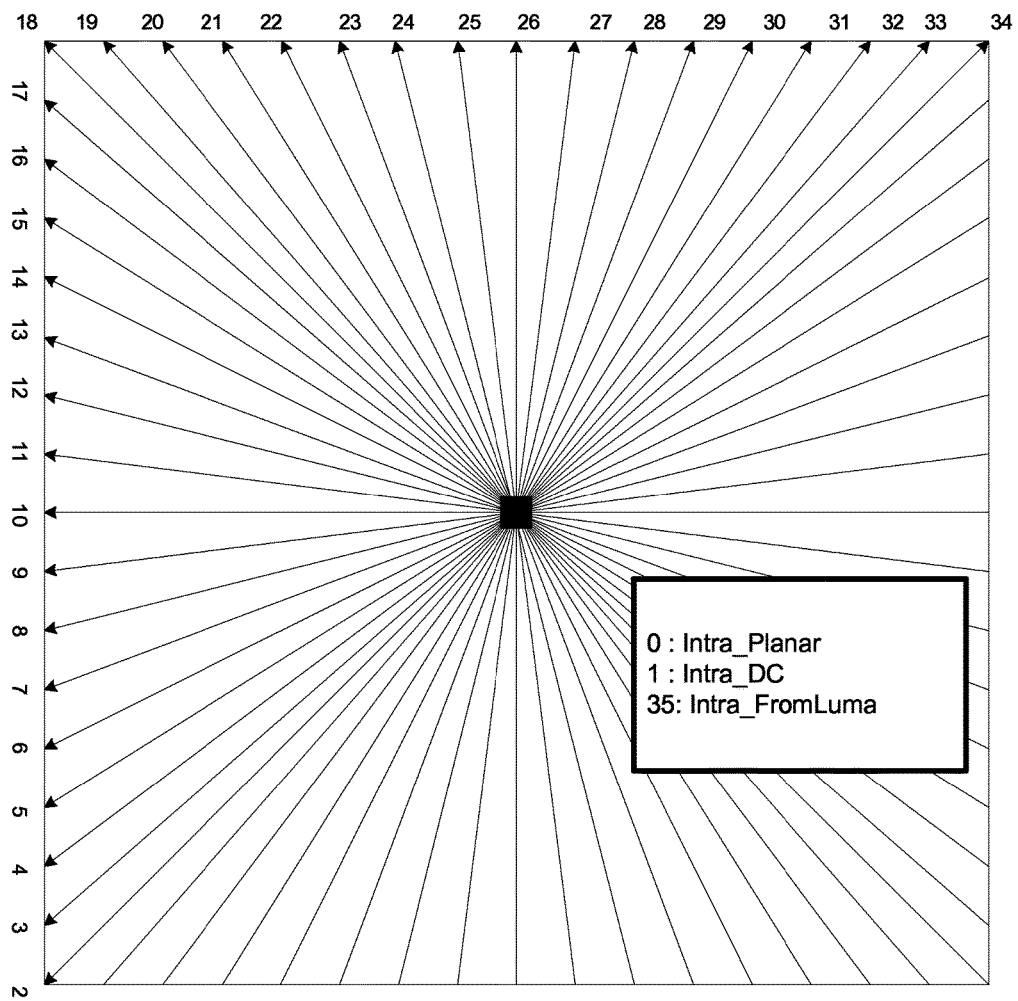
FIG. 4 is a conceptual diagram illustrating the 35 HEVC prediction modes according to one or more techniques of the current disclosure.

FIG. 4 is a conceptual diagram illustrating the 35 HEVC prediction modes according to one or more techniques of the current disclosure. In the current HEVC, for the luma component of each Prediction Unit (PU), an intra prediction method is utilized with 33 angular prediction modes (indexed from 2 to 34), DC mode (indexed with 1) and Planar mode (indexed with 0), as described with respect to FIG. 4.

In addition to the above 35 intra modes, one more mode, named 'I-PCM', is also employed by HEVC. In I-PCM mode, prediction, transform, quantization, and entropy coding are bypassed while the prediction samples are coded by a predefined number of bits. The main purpose of the I-PCM mode is to handle the situation when the signal cannot be efficiently coded by other modes.

FIG. 5 is a conceptual diagram illustrating spatial neighboring motion vector candidates for merge and advanced motion vector prediction (AMVP) modes according to one or more techniques of the current disclosure. As described with respect to FIG. 5, spatial MV candidates are derived from the neighboring blocks shown on FIG. 5 for a specific PU (PU0), although the methods generating the candidates from the blocks differ for merge and AMVP modes.

In merge mode, up to four spatial MV candidates may be derived with the orders showed on FIG. 5(*a*) with numbers, and the order is the following: left (0), above (1), above right (2), below left (3), and above left (4), as shown in FIG. 5(*a*).

In AMVP mode, the neighboring blocks are divided into two groups: left group consisting of the block 0 and 1, and above group consisting of the blocks 2, 3, and 4 as shown on FIG. 5(*b*). For each group, the potential candidate in a neighboring block referring to the same reference picture as that indicated by the signaled reference index has the highest priority to be chosen to form a final candidate of the group. It is possible that all neighboring blocks don't contain a motion vector pointing to the same reference picture. Therefore, if such a candidate cannot be found, the first available candidate will be scaled to form the final candidate, thus the temporal distance differences can be compensated.

FIG. 6 is a conceptual diagram illustrating an intra-block copy (BC) example according to one or more techniques of the current disclosure. As described with respect to FIG. 6, the Intra Block-Copy (BC) has been included in RExt. An example of Intra BC is shown as in FIG. 6, wherein the current CU is predicted from an already decoded block of the current picture/slice. The current Intra BC block size can be as large as a CU size, which ranges from 8×8 to 64×64, although some applications, further constrains may apply in addition.

FIG. 7 is a conceptual diagram illustrating an example of a target block and reference sample for an intra 8×8 block, according to one or more techniques of the current disclosure. As described below with respect to FIG. 7, a transform matrix is derived from the reference sample values. Different reference samples are utilized for the intra case and inter case. For the case of intra block, target block and reference samples are shown in FIG. 7. In this figure, target block consists of 8×8 crosshatched samples and references are striped and dotted samples.

For the case of inter block, reference samples for the matrix derivation is the same as that for motion compensation. In order to realize the shift operation, reference samples in the AMP block is sub-sampled such that the number of samples becomes the power-of-two. For example, the number of reference samples in a 12×16 block is reduced to ⅔.

According to some techniques of the current disclosure, the color-space transform process may be applied. In such examples, there is no need to signal whether the transform process is invoked or not. In addition, both the encoder and decoder sides may derive the transform matrix with the same method to avoid the overhead for signaling the transform matrix.

Figure 8:
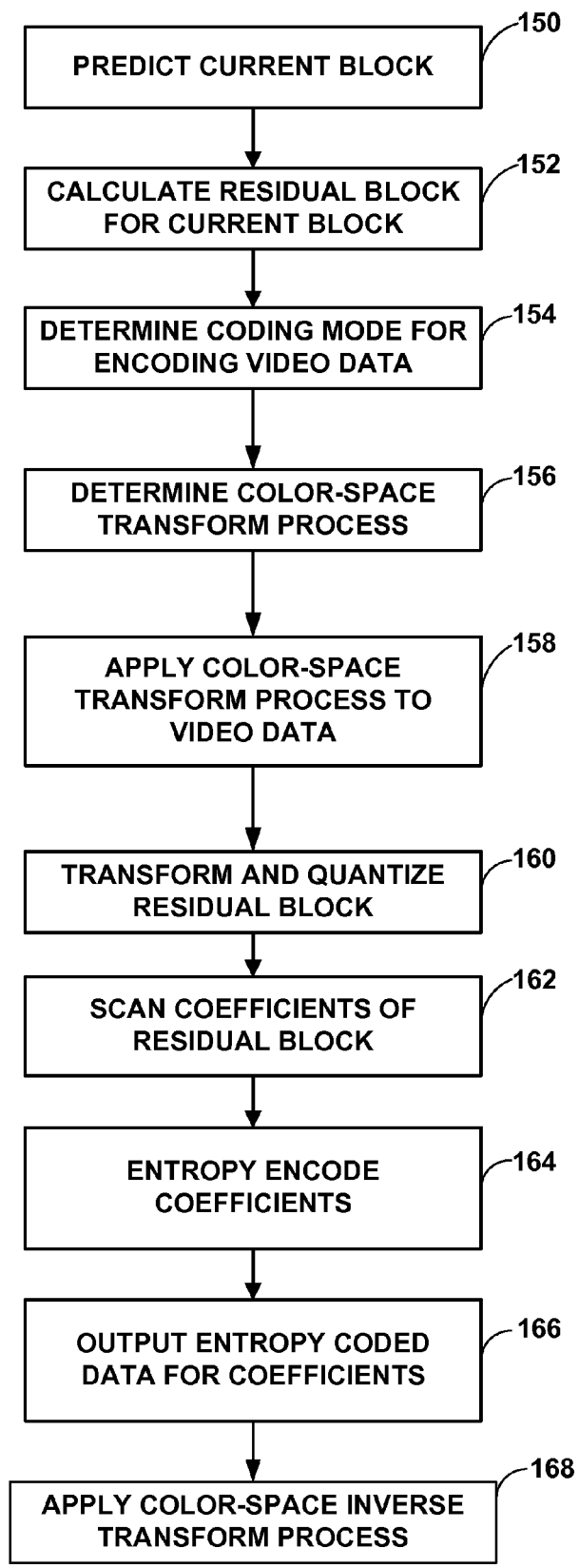
FIG. 8 is a flow diagram illustrating an encoding technique according to one or more techniques of the current disclosure.

FIG. 8 is a flowchart illustrating an example method for encoding a current block. The current block may comprise a current CU or a portion of the current CU. Although described with respect to video encoder 20 (FIGS. 1 and 2), it should be understood that other devices may be configured to perform a method similar to that of FIG. 8.

In this example, video encoder 20 initially predicts the current block (150). For example, video encoder 20 may calculate one or more prediction units (PUs) for the current block. Video encoder 20 may then calculate a residual block for the current block, e.g., to produce a transform unit (TU) (152). To calculate the residual block, video encoder 20 may calculate a difference between the original, uncoded block and the predicted block for the current block. Entropy encoding unit 56 of video encoder 20 may determine a coding mode used to encode the video data (154). The coding mode may be one of a lossy coding mode or a lossless coding mode. Entropy encoding unit 56 may further determine a color-space transform process dependent on the coding mode used to encode the video data (156). Entropy encoding unit 56 of video encoder 20 may further apply the color-space transform process to the video data (158). Video encoder 20 may then transform and quantize coefficients of the residual block (160). Next, video encoder 20 may scan the quantized transform coefficients of the residual block (162). During the scan, or following the scan, video encoder 20 may entropy encode the coefficients (164). For example, video encoder 20 may encode the coefficients using CAVLC or CABAC. Video encoder 20 may then output the entropy coded data of the block (166). Entropy encoding unit 56 of video encoder 20 may further apply a color-space inverse transform process in a decoding loop of the encoding process (168). In the techniques of this disclosure, the color-space inverse transform process is independent of whether the coding mode is the lossy coding mode or the lossless coding mode.

In some examples, the coding mode may be the lossy coding mode. In such examples, the color-space transform process may be a YCoCg matrix. Entropy encoding unit 56 of video encoder 20 may modify a Co component and a CG component of the YCoCg matrix with an N-bit left shift before applying the color-space inverse transform process in the decoding loop of the encoding process. In some examples, N may equal 1.

In other examples, the coding mode may be the lossless coding mode. In such examples, the color-space transform process may be a YCoCg-R matrix. Entropy encoding unit 56 of video encoder 20 may increase a bit depth of a Co component and a Cg component of the YCoCg-R matrix by 1.

In either of the two above examples, the color-space inverse transform process may be a lossless color-space inverse transform process. In such examples, the lossless color-space inverse transform process may comprise a YCoCg-R matrix.

In some examples, entropy encoding unit 56 of video encoder 20 may further determine to use color-space conversion for encoding the video data. In doing so, entropy encoding unit 56 of video encoder 20 may set a value of a syntax element of the video data to indicate the use of color-space conversion in response to determining to use color-space conversion for the coding unit. In some examples, the syntax element comprises a one-bit flag. In some examples, the syntax element is signaled when the coding unit is coded using a mode other than intra-pulse code modulation (IPCM) mode. In other examples, the syntax element is signaled only when there are non-zero coefficients in a transform unit of the coding unit. In some examples, a value of 1 for the syntax element indicates that the coding unit was encoded using color-space conversion.

In some examples, the syntax element may not be signaled. For instance, the syntax element may not be signaled when the coding unit is intra coded and when a luma prediction mode and a chroma prediction mode of a prediction unit within the coding unit are different. In another example, the syntax element may not be signaled when the coding unit is coded with a palette mode. In these examples, the syntax element may not be present in a received bitstream that comprises the video data, and decoding the syntax element may comprise inferring the value of the syntax element.

In some examples, the syntax element is a first syntax element and the video data is a first set of video data. In such examples, entropy encoding unit 56 of video encoder 20 may determine a value of a palette index for a first pixel in a second coding unit of a second set of video data. Entropy encoding unit 56 of video encoder 20 may further determine values of palette indexes for one or more next pixels in a scanning order immediately succeeding the first pixel. Determining the values of the palette indexes may comprise determining the values of the palette indexes until a pixel has a palette index with a value different than the value of the palette index for the first pixel. Entropy encoding unit 56 of video encoder 20 may further determine a number of palette index values determined for the next pixels. Based on the number of palette index values, entropy encoding unit 56 of video encoder 20 may encode the palette index using either a first mode or a second mode. When the number of palette index values is greater than one, entropy encoding unit 56 of video encoder 20 may set a value of a second syntax element to indicate that the first mode was used to encoding the palette index and set a value of a third syntax element equal to the number of palette index values. When the number of palette index values is less than or equal to one, entropy encoding unit 56 of video encoder 20 may set the value of the second syntax element to indicate that the second mode was used to encoding the palette index. In some examples, the first mode is a run mode, and the second mode is a pixel mode.

In some examples, encoding the syntax element may comprise entropy encoding unit 56 of video encoder 20 encoding data of a supplemental enhancement information (SEI) message that indicates whether the coding unit was encoded using color-space conversion.

Figure 9:
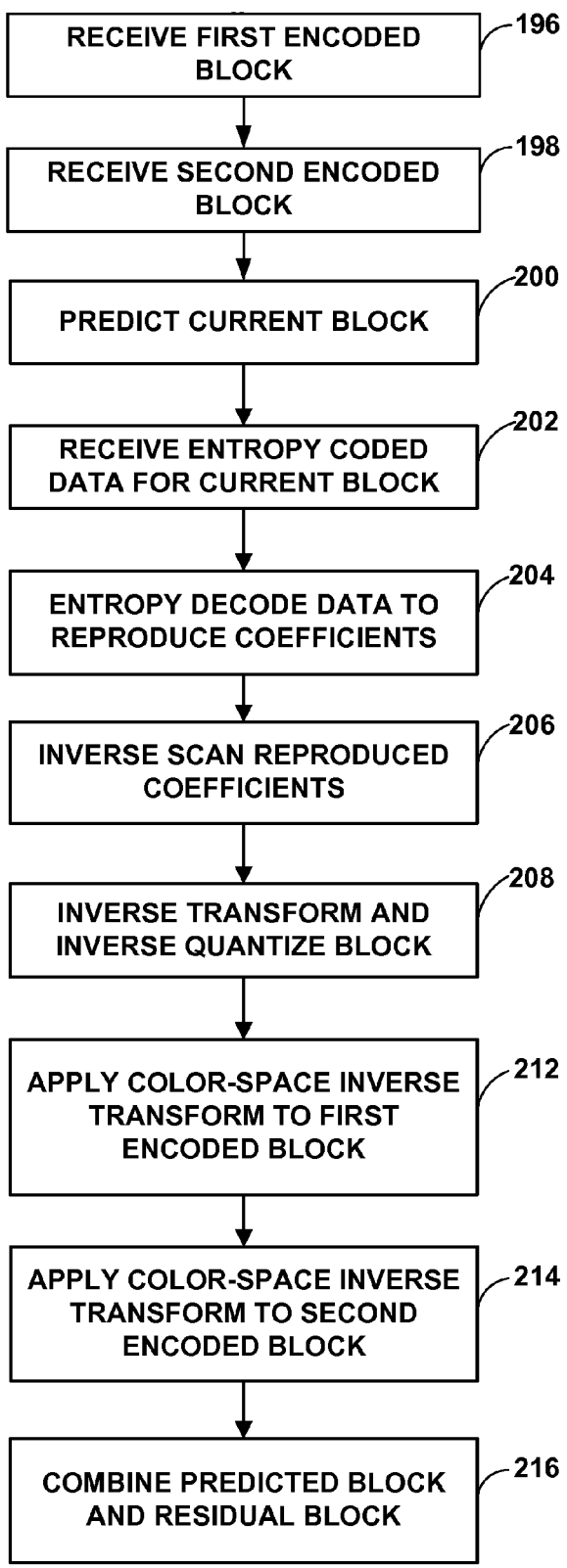
FIG. 9 is a flow diagram illustrating a decoding technique according to one or more techniques of the current disclosure.

FIG. 9 is a flowchart illustrating an example method for decoding a current block of video data. The current block may comprise a current CU or a portion of the current CU. Although described with respect to video decoder 30 (FIGS. 1 and 3), it should be understood that other devices may be configured to perform a method similar to that of FIG. 9.

Entropy decoding unit 70 of video decoder 30 may receive a first encoded block of video data (196). The first encoded block of video data was encoded using a lossy coding mode and a first color-space transform process. Entropy decoding unit 70 of video decoder 30 may further receive a second encoded block of video data (198). The second encoded block of video data was encoded using a lossless coding mode and a second color-space transform process.

Video decoder 30 may predict the current block (200), e.g., using an intra- or inter-prediction mode to calculate a predicted block for the current block. Video decoder 30 may also receive entropy coded data for the current block, such as entropy coded data for coefficients of a residual block corresponding to the current block (202). Video decoder 30 may entropy decode the entropy coded data to reproduce coefficients of the residual block (204). Video decoder 30 may then inverse scan the reproduced coefficients (206), to create a block of quantized transform coefficients. Video decoder 30 may then inverse transform and inverse quantize the coefficients (208). Entropy decoding unit 70 of video decoder 30 may decode a syntax element for the current block (210).

Entropy decoding unit 70 of video decoder 30 may further apply a color-space inverse transform process to the first encoded block of video data (212). Entropy decoding unit 70 of video decoder 30 may further apply the same color-space inverse transform process to the second encoded block of video data (214). Video decoder 30 may ultimately decode the current block by combining the predicted block and the residual block (216). On the decoder side, there may be no need to perform a color-space forward transform process, regardless of the coding mode. In some examples, the color-space inverse transform process may be fixed. In some examples, the blocks of video data may be coding units.

In some examples, entropy decoding unit 70 of video decoder 30 may further modify one or more components of the first encoded block of video data with an N-bit right shift or an N-bit left shift. In some examples, N may be equal to 1. In some examples, the one or more components of the first encoded block of video data may be two chroma components.

In some examples, the first color-space transform process comprises applying a YCoCg matrix. In further examples, the second color-space transform process comprises applying a YCoCg-R matrix. In either example, the color-space inverse transform process may comprise a lossless color-space inverse transform process. In some examples, the lossless color-space inverse transform process comprises applying a YCoCg-R matrix.

In some examples, entropy decoding unit 70 of video decoder 30 may decode a syntax element of a coding unit of video data. The syntax element may indicate whether the coding unit was encoded using color-space conversion. In some examples, the syntax element may comprise a one-bit flag. In some examples, the coding unit is coded in a mode other than intra-pulse code modulation (IPCM) mode and the syntax element is signaled only for coding units using a mode other than the IPCM mode. In some examples, the syntax element indicates that the coding unit was encoded using color-space conversion when there are non-zero coefficients in a transform unit of the coding unit. In some examples, a value of 1 for the syntax element indicates that the coding unit was encoded using color-space conversion. Entropy decoding unit 70 of video decoder 30 may further determine whether a value of the syntax element indicates that the coding unit was encoded using color-space conversion. In response to determining that the syntax element indicates that the coding unit was coded using color-space conversion, entropy decoding unit 70 of video decoder 30 may apply the color-space inverse transform process.

In some examples, the syntax element may indicate that color-space conversion was not used for encoding the coding unit. For instance, the syntax element may indicate that color-space conversion was not used for encoding the coding unit when the coding unit is intra coded and when a luma prediction mode and a chroma prediction mode of a prediction unit within the coding unit are different. In another example, the syntax element may indicate that color-space conversion was not used for encoding the coding unit when the coding unit is coded with a palette mode. In these examples, the received bitstream may not include the syntax element.

In some examples, the syntax element is a first syntax element and the video data is a first set of video data. In such examples, entropy decoding unit 70 of video decoder 30 may further determine a value of a second syntax element of a second set of video data. The second syntax element may indicate whether a palette mode was used for encoding the second set of video data. In response to the second syntax element indicating that the palette mode was used for encoding the video data, entropy decoding unit 70 of video decoder 30 may determine a value of a third syntax element. The third syntax element may indicate whether a first mode or a second mode is used for decoding a palette index for a pixel in the coding unit. Based on the determined value of the second syntax element, entropy decoding unit 70 of video decoder 30 may decode the palette index using either the first mode or the second mode. When using the first mode, entropy decoding unit 70 of video decoder 30 may determine a value of the palette index, determine a value of a fourth syntax element that indicates a number of pixels in a scanning order immediately succeeding the pixel currently being decoded, and duplicate the result of determining the value of the palette index for the next N pixels in the scanning order, with N equaling the value of the fourth syntax element. In some examples, the first mode is a run mode. When using the second mode, entropy decoding unit 70 of video decoder 30 may determine the value of the palette index and output a pixel sample value for the pixel, where the pixel sample value is equal to the value of the palette index. In some examples, the second mode is a pixel mode.

In some examples, decoding the syntax element comprises entropy decoding unit 70 of video decoder 30 being configured to decode data of a supplemental enhancement information (SEI) message that indicates whether the coding unit was encoded using color-space conversion.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method of encoding video data in an encoding process, the method comprising:
   determining a coding mode used to encode the video data, wherein the coding mode is one of a lossy coding mode or a lossless coding mode;
   determining a color-space transform process dependent on the coding mode used to encode the video data, wherein determining the color-space transform process comprises determining that the color transform process comprises a first color-space transform process when the coding mode is the lossy coding mode, and determining that the color-space transform process comprises a second color-space transform process when the coding mode is the lossless coding mode, and wherein the first color-space transform process is different than the second color-space transform process;
   applying the color-space transform process to the video data; and
   applying a color-space inverse transform process in a decoding loop of the encoding process, wherein a coding mode of the color-space inverse transform process applied in the decoding loop of the encoding process is independent of whether the color-space transform process used to encode the video data is the first color-space transform process or the second color-space transform process.

2. The method of claim 1, wherein the coding mode used to encode the video data is the lossy coding mode, and wherein applying the first color-space transform process comprises applying a YCoCg matrix.

3. The method of claim 2, further comprising modifying a Co component and a Cg component of the YCoCg matrix with an N-bit left shift before applying the color-space inverse transform process in the decoding loop of the encoding process.

4. The method of claim 3, wherein N is equal to 1.

5. The method of claim 1, wherein the coding mode used to encode the video data is the lossless coding mode, and wherein applying the second color-space transform process comprises applying a YCoCg-R matrix.

6. The method of claim 5, further comprising increasing a bit depth of a Co component and a Cg component by 1.

7. The method of claim 1, wherein the coding mode of the color-space inverse transform process is a lossless coding mode.

8. The method of claim 7, wherein applying the lossless color-space inverse transform process comprises applying a YCoCg-R matrix.

9. The method of claim 1, further comprising determining to use color-space conversion for encoding the video data, wherein determining to use color-space conversion for encoding the video data comprises:
setting a value of a syntax element that indicates that the video data was encoded using color-space conversion.

10. The method of claim 9, wherein the syntax element comprises a one-bit flag.

11. The method of claim 9, wherein the coding unit is coded in a mode other than intra-pulse code modulation (IPCM) mode, and wherein the syntax element indicates that the coding unit was encoded using color-space conversion when the coding unit is coded using a mode other than intra-pulse code modulation (IPCM) mode.

12. The method of claim 9, wherein the syntax element indicates that the coding unit was encoded using color-space conversion when there are non-zero coefficients in a transform unit of the coding unit.

13. The method of claim 9, wherein the syntax element is not signaled when the coding unit is intra coded and when a luma prediction mode and a chroma prediction mode of a prediction unit within the coding unit are different.

14. The method of claim 9, wherein the syntax element is not signaled when the coding unit is coded with a palette mode.

15. The method of claim 9, wherein a value of 1 for the syntax element indicates that color-space conversion is used for encoding the coding unit.

16. A video encoding device comprising:
a memory configured to store video data; and
one or more processors configured to:
determine a coding mode used to encode the video data, wherein the coding mode is one of a lossy coding mode or a lossless coding mode;
determine a color-space transform process dependent on the coding mode used to encode the video data, wherein the color-space transform process is determined to comprise a first color-space transform process when the coding mode is the lossy coding mode, wherein the color-space transform process is determined to be a second color-space transform process when the coding mode is the lossless coding mode, and wherein the first color-space transform process is different than the second color-space transform process;
apply the color-space transform process to the video data; and
apply a color-space inverse transform process in a decoding loop of the encoding process, wherein a coding mode of the color-space inverse transform process applied in the decoding loop of the encoding process is independent of whether the color-space transform process used to encode the video data is the first color-space transform process or the second color-space transform process.

17. The video encoding device of claim 16, wherein the coding mode used to encode the video data is the lossy coding mode, and wherein the one or more processors being configured to apply the first color-space transform process comprises the one or more processors being configured to apply a YCoCg matrix.

18. The video encoding device of claim 17, wherein the one or more processors are further configured to modify a Co component and a Cg component of the YCoCg matrix with an N-bit left shift before applying the color-space inverse transform process in the decoding loop of the encoding process.

19. The video encoding device of claim 18, wherein N is equal to 1.

20. The video encoding device of claim 16, wherein the coding mode used to encode the video data is the lossless coding mode, and wherein the one or more processors being configured to apply the second color-space transform process comprises the one or more processors being configured to apply a YCoCg-R matrix.

21. The video encoding device of claim 20, wherein the one or more processors are further configured to increase a bit depth of a Co component and a Cg component by 1.

22. The video encoding device of claim 16, wherein the coding mode of the color-space inverse transform process is a lossless coding mode.

23. The video encoding device of claim 22, wherein the one or more processors being configured to apply the lossless color-space inverse transform process comprises the one or more processors being configured to apply a YCoCg-R matrix.

24. The video encoding device of claim 16, wherein the one or more processors are further configured to determine to use color-space conversion for encoding the video data, wherein the one or more processors being configured to determine to use color-space conversion for encoding the video data comprises the one or more processors being configured to:
set a value of a syntax element that indicates that the video data was encoded using color-space conversion.

25. The video encoding device of claim 24, wherein the syntax element comprises a one-bit flag.

26. The video encoding device of claim 24, wherein the syntax element is signaled when the coding unit is coded using a mode other than intra-pulse code modulation (IPCM) mode.

27. The video encoding device of claim 24, wherein the syntax element is signaled only when there are non-zero coefficients in a transform unit of the coding unit.

28. The video encoding device of claim 24, wherein the syntax element is not signaled when the coding unit is intra coded and when a luma prediction mode and a chroma prediction mode of a prediction unit within the coding unit are different.

29. The video encoding device of claim 24, wherein the syntax element is not signaled when the coding unit is coded with a palette mode.

30. The video coding device of claim 24, wherein a value of 1 for the syntax element indicates that the coding unit was encoded using color-space conversion.

31. A method of decoding video data, the method comprising:
receiving a first encoded block of video data, wherein the first encoded block of video data was encoded using a lossy coding mode and a first color-space transform process;
receiving a second encoded block of video data, wherein the second encoded block of video data was encoded using a lossless coding mode and a second color-space transform process, wherein the first color-space transform process used to encode the first encoded block of video data is different than the second color-space transform process used to encode the second encoded block of video data;

applying a color-space inverse transform process to the first encoded block of video data; and applying the color-space inverse transform process to the second encoded block of video data, wherein a coding mode of the color-space inverse transform process applied to both the first encoded block of video data and the second block of video data is independent of the lossy coding mode used to encode the first encoded block of video data and the lossless coding mode used to encode the second encoded block of video data.

32. The method of claim 31, further comprising:
modifying one or more components of the first encoded block of video data with an N-bit right shift or an N-bit left shift.

33. The method of claim 32, wherein N is equal to 1.

34. The method of claim 32, wherein the one or more components of the first encoded block of video data comprise two chroma components.

35. The method of claim 31, wherein the coding mode of the color-space inverse transform process is a lossless coding mode.

36. The method of claim 35, wherein the lossless color-space inverse transform process comprises a YCoCg-R matrix.

37. The method of claim 31, further comprising:
decoding a syntax element of a coding unit of video data, wherein the syntax element indicates whether the coding unit was encoded using color-space conversion;
determining whether a value of the syntax element indicates that the coding unit was encoded using color-space conversion; and
in response to determining that the syntax element indicates that the coding unit was coded using color-space conversion, applying the color-space inverse transform process.

38. The method of claim 37, wherein the syntax element comprises a one-bit flag.

39. The method of claim 37, wherein the coding unit is coded in a mode other than intra-pulse code modulation (IPCM) mode, and wherein the syntax element is signaled only for coding units using a mode other than the IPCM mode.

40. The method of claim 37, wherein the syntax element indicates that the coding unit was encoded using color-space conversion when there are non-zero coefficients in a transform unit of the coding unit.

41. The method of claim 37, wherein the syntax element indicates that the coding unit was not encoded using color-space conversion when the coding unit is intra coded and when a luma prediction mode and a chroma prediction mode of a prediction unit within the coding unit are different, wherein the syntax element is not present in a received bitstream that comprises the video data, and wherein decoding the syntax element comprises inferring the value of the syntax element.

42. The method of claim 37, wherein the syntax element indicates that the coding unit was not encoded using color-space conversion when the coding unit is coded with a palette mode, wherein the syntax element is not present in a received bitstream that comprises the video data, and wherein decoding the syntax element comprises inferring the value of the syntax element.

43. The method of claim 37, wherein a value of 1 for the syntax element indicates that the coding unit was encoded using color-space conversion.

44. A video decoding device comprising:
a memory configured to store video data; and
one or more processors configured to:
receive a first encoded block of video data, wherein the first encoded block of video data was encoded using a lossy coding mode and a first color-space transform process;
receive a second encoded block of video data, wherein the second encoded block of video data was encoded using a lossless coding mode and a second color-space transform process, wherein the first color-space transform process used to encode the first encoded block of video data is different than the second color-space transform process used to encode the second encoded block of video data;
apply a color-space inverse transform process to the first encoded block of video data; and
apply the color-space inverse transform process to the second encoded block of video data, wherein a coding mode of the color-space inverse transform process applied to both the first encoded block of video data and the second block of video data is independent of the lossy coding mode used to encode the first encoded block of video data and the lossless coding mode used to encode the second encoded block of video data.

45. The video decoding device of claim 44, wherein the one or more processors are further configured to:
modify one or more components of the first encoded block of video data with an N-bit right shift or an N-bit left shift.

46. The video decoding device of claim 45, wherein N is equal to 1.

47. The video decoding device of claim 45, wherein the one or more components of the first encoded block of video data comprise two chroma components.

48. The video decoding device of claim 44, wherein the coding mode of the color-space inverse transform process is a lossless coding mode.

49. The video decoding device of claim 48, wherein the lossless color-space inverse transform process comprises a YCoCg-R matrix.

50. The video decoding device of claim 44, wherein the one or more processors are further configured to:
decode a syntax element of a coding unit of video data, wherein the syntax element indicates whether the coding unit was encoded using color-space conversion;
determine whether a value of the syntax element indicates that the coding unit was encoded using color-space conversion; and
in response to determining that the syntax element indicates that the coding unit was coded using color-space conversion, apply the color-space inverse transform process.

51. The video decoding device of claim 50, wherein the syntax element comprises a one-bit flag.

52. The video decoding device of claim 50, wherein the coding unit is coded in a mode other than intra-pulse code modulation (IPCM) mode, and wherein the syntax element is signaled only for coding units using a mode other than the IPCM mode.

53. The video decoding device of claim 50, wherein the syntax element indicates that the coding unit was encoded using color-space conversion when there are non-zero coefficients in a transform unit of the coding unit.

54. The video decoding device of claim 50, wherein the syntax element indicates that the coding unit was not encoded using color-space conversion when the coding unit is intra coded and when a luma prediction mode and a chroma prediction mode of a prediction unit within the coding unit are different, wherein the syntax element is not present in a received bitstream that comprises the video data, and wherein decoding the syntax element comprises inferring the value of the syntax element.

55. The video decoding device of claim 50, wherein the syntax element indicates that the coding unit was not encoded using color-space conversion when the coding unit is coded with a palette mode, wherein the syntax element is not present in a received bitstream that comprises the video data, and wherein decoding the syntax element comprises inferring the value of the syntax element.

56. The video decoding device of claim 50, wherein a value of 1 for the syntax element indicates that the coding unit was encoded using color-space conversion.

57. A video decoding apparatus comprising:
means for receiving a first encoded block of video data, wherein the first encoded block of video data was encoded using a lossy coding mode and a first color-space transform process;
means for receiving a second encoded block of video data, wherein the second encoded block of video data was encoded using a lossless coding mode and a second color-space transform process, wherein the first color-space transform process used to encode the first encoded block of video data is different than the second color-space transform process used to encode the second encoded block of video data;
means for applying a color-space inverse transform process to the first encoded block of video data; and
means for applying the color-space inverse transform process to the second encoded block of video data, wherein a coding mode of the color-space inverse transform process applied to both the first encoded block of video data and the second block of video data is independent of the lossy coding mode used to encode the first encoded block of video data and the lossless coding mode used to encode the second encoded block of video data.

58. The video decoding apparatus of claim 57, further comprising:
means for modifying one or more components of the first encoded block of video data with an N-bit right shift or an N-bit left shift.

59. The video decoding apparatus of claim 58, wherein N is equal to 1.

60. The video decoding apparatus of claim 58, wherein the one or more components of the first encoded block of video data comprise two chroma components.

61. The video decoding apparatus of claim 57, wherein the coding mode of the color-space inverse transform process is a lossless coding mode.

62. The video decoding apparatus of claim 61, wherein the lossless color-space inverse transform process comprises a YCoCg-R matrix.

63. A non-transitory computer-readable storage medium comprising instructions that, when executed, cause one or more processors of a video decoding device to:
receive a first encoded block of video data, wherein the first encoded block of video data was encoded using a lossy coding mode and a first color-space transform process;
receive a second encoded block of video data, wherein the second encoded block of video data was encoded using a lossless coding mode and a second color-space transform process, wherein the first color-space transform process used to encode the first encoded block of video data is different than the second color-space transform process used to encode the second encoded block of video data;
apply a color-space inverse transform process to the first encoded block of video data; and
apply the color-space inverse transform process to the second encoded block of video data, wherein a coding mode of the color-space inverse transform process is independent of the lossy coding mode used to encode the first encoded block of video data and the lossless coding mode used to encode the second encoded block of video data.

64. The non-transitory computer-readable storage medium of claim 63, wherein the instructions further cause the one or more processors to:
modify one or more components of the first encoded block of video data with an N-bit right shift or an N-bit left shift.

65. The non-transitory computer-readable storage medium of claim 64, wherein N is equal to 0.

66. The non-transitory computer-readable storage medium of claim 64, wherein the one or more components of the first encoded block of video data comprise two chroma components.

67. The non-transitory computer-readable storage medium of claim 63, wherein the coding mode of the color-space inverse transform process is a lossless coding mode.

68. The non-transitory computer-readable storage medium of claim 67, wherein the lossless color-space inverse transform process comprises a YCoCg-R matrix.

* * * * *